United States Patent
Kayukawa et al.

(10) Patent No.: US 6,817,964 B2
(45) Date of Patent: Nov. 16, 2004

(54) CONTROL APPARATUS OF HYBRID VEHICLE

(75) Inventors: Atsushi Kayukawa, Anjo (JP); Yoshitaka Murase, Anjo (JP); Eiji Takasu, Anjo (JP); Chikashi Satou, Anjo (JP)

(73) Assignee: Aisin AW Co., Ltd., Anjo (JP)

( * ) Notice: Subject to any disclaimer, the term of this patent is extended or adjusted under 35 U.S.C. 154(b) by 7 days.

(21) Appl. No.: 10/296,989

(22) PCT Filed: Apr. 26, 2002

(86) PCT No.: PCT/JP02/04221
§ 371 (c)(1),
(2), (4) Date: Jun. 9, 2003

(87) PCT Pub. No.: WO02/087913
PCT Pub. Date: Nov. 7, 2002

(65) Prior Publication Data
US 2004/0029678 A1 Feb. 12, 2004

(30) Foreign Application Priority Data
Apr. 26, 2001 (JP) .......................................... 2001-130190
Mar. 20, 2002 (JP) .......................................... 2002-079458

(51) Int. Cl.$^7$ .......................... H02P 17/00; B62D 11/00; B60L 11/00; G06F 17/00; G06F 19/00
(52) U.S. Cl. .......................... 477/15; 477/97; 180/65.2; 180/65.3; 701/22; 701/65; 701/118
(58) Field of Search .......................... 477/15, 17, 97, 477/115; 701/22, 65, 51, 117, 118; 180/65.2, 65.3

(56) References Cited

U.S. PATENT DOCUMENTS

| | | | | |
|---|---|---|---|---|
| 5,939,794 A | * | 8/1999 | Sakai et al. | 290/40 A |
| 6,283,086 B1 | * | 9/2001 | Yamamoto et al. | 123/198 D |
| 6,561,295 B1 | * | 5/2003 | Kuroda et al. | 180/65.2 |
| 6,629,515 B1 | * | 10/2003 | Yamamoto et al. | 123/179.4 |
| 2003/0104900 A1 | * | 6/2003 | Takahashi et al. | 477/3 |

FOREIGN PATENT DOCUMENTS

| | | |
|---|---|---|
| JP | 2000-217203 A | 8/2000 |
| JP | 2000-328980 A | 11/2000 |
| JP | 2001-71792 A | 3/2001 |

* cited by examiner

*Primary Examiner*—Tisha Lewis
(74) *Attorney, Agent, or Firm*—Oliff & Berridge, PLC

(57) ABSTRACT

A control apparatus and method for a hybrid vehicle that judges whether the vehicle is running on a congested road based on an output from a sensor, causes a take-off from a first state where a gear ratio of an automatic transmission is large at a time of taking-off when running on a congested road, causes the take-off from a second state where the gear ratio of the automatic transmission is small at the time of taking-off when not running on the congested road and replenishes, by driving a motor/generator, a part of an under torque of the driving source created by taking-off from a state where the gear ratio of the automatic transmission is large, when a temporary high acceleration take-off request is made while a judgment of congested road running is maintained.

22 Claims, 19 Drawing Sheets

|     | C1 | C2 | C3 | B1 | B2 | B3 | B4 | B5 | F1 | F2 |
|-----|----|----|----|----|----|----|----|----|----|----|
| N   |    |    |    |    |    |    |    | ○  |    |    |
| 1ST | ○  |    |    |    |    | △  |    | ○  |    | ○  |
| 2ND | ○  |    |    | △  | ○  |    |    | ○  | ○  |    |
| 3RD | ○  |    |    | △  | ○  |    | ○  |    | ○  |    |
| 4TH | ○  |    | ○  | △  | ○  |    |    |    | ○  |    |
| 5TH | ○  | ○  | ○  |    |    |    |    |    |    |    |
| REV |    | ○  |    |    |    | ○  |    | ○  |    |    |

FIG. 2(b)

CONTROL APPARATUS OF HYBRID VEHICLE

BACKGROUND OF THE INVENTION

1. Field of Invention

The invention relates to a control apparatus of a hybrid vehicle that uses an internal combustion engine and a motor/generator as a driving source.

2. Description of Related Art

FIG. 17 is a time chart showing one example of downshift disabling control on a congested road, and FIG. 18 is a time chart showing one example of control at the time of throttle actuation under downshift disabling control on a congested road.

Normally, on a congested road, a take-off/stop is repeated frequently and, concomitantly, an upshift/downshift is also repeated frequently. As such, a busy-shift state arises which deteriorates the quality of the ride. To prevent the occurrence of such busy shifting when the road is a congested road, congested road control that disables downshift to first or to second or lower and takes-off at a shift speed of second or higher at all times has been conventionally carried out.

However, when a driver feels a need to accelerate and actuates a throttle more than a specified amount, conventional congested road control on a congested road is canceled as shown in FIG. 18 (a time T1), and thereafter, normal shift control with downshift is executed. Therefore, for a case in which a congested state continues thereafter, busy shifting occurs.

Moreover, under congested road control as shown in FIG. 17, a vehicle speed is a low speed and, when taking-off, a vehicle takes-off at a high shift speed and an output on an internal combustion engine side is maintained in a low torque state. As such, when control is applied to a hybrid vehicle as it is, there are few opportunities for a motor/generator to perform a regenerating operation and charge of a battery. Therefore, the state of charge (SOC) decreases and a need for charging the battery when the vehicle stops occurs. A problem thus occurs in which the idle stop control for stopping the internal combustion engine when the vehicle stops, which is a characteristic of a hybrid vehicle, is difficult to execute.

SUMMARY OF THE INVENTION

Accordingly, the invention thus provides a control apparatus for a hybrid vehicle which does not cancel congested road control immediately even when a throttle is actuated under congested road control, and enables a charge (regeneration) of the battery even under congested road control.

The control apparatus for a hybrid vehicle with an internal combustion engine and a motor/generator connected to the internal combustion engine used as a driving source, an automatic transmission connected to the driving source, axles connected to the automatic transmission, and a sensor for detecting a running state of the vehicle according to a first exemplary aspect of the invention includes a controller. The controller judges whether the vehicle is running on a congested road based on an output from the sensor, causes a take-off from a first state where a gear ratio of the automatic transmission is large at a time of taking-off when running on the congested road, causes the take-off from a second state where the gear ratio of the automatic transmission is small at the time of taking-off when not running on the congested road and replenishes, by driving the motor/generator, a part of an under torque of the driving source created by taking-off from a state where the gear ratio of the automatic transmission is large, when a temporary high acceleration take-off request is made while a judgment of congested road running is maintained.

Thereby, at the time of temporary acceleration during congested running, the controller replenishes the under torque portion of the driving source using the drive of the motor/generator, so that even for a case in which a temporary high acceleration take-off request is made during congested road running, it is possible to perform a take-off operation without a sense of discomfort by maintaining the take-off operation from a state in which the gear ratio of the automatic transmission is large. Also, consequently, since there is no need to cancel congested road control, in congested road running thereafter, taking-off from a state in which the gear ratio of the automatic transmission is small is prevented, and busy shifting is prevented.

The hybrid vehicle according to a second exemplary aspect of the invention includes an internal combustion engine, a motor/generator connected to the internal combustion engine, wherein the internal combustion engine and the motor/generator are used as a driving source, an automatic transmission connected to the driving source, axles connected to the automatic transmission, a sensor for detecting a running state of the vehicle, and a controller. The controller judges whether the vehicle is running on a congested road based on an output from the sensor, causes the automatic transmission to perform normal shifting at a time of take-off by the internal combustion engine and consequently causes a regenerating operation by driving the motor/generator with extra torque produced from the internal combustion engine at the time of take-off, for a case in which when the vehicle is running on the congested road.

Thereby, for a case in which the controller judges that the vehicle is running on a congested road, it is possible at the time of take-off by the internal combustion engine to cause the automatic transmission to perform normal shifting and perform a regenerating operation by driving the motor/generator with extra torque produced from the internal combustion engine at the time of takeoff. It is possible to charge a battery, ensure a sufficient SOC, and effectively execute idle stop control, which is a characteristic of a hybrid vehicle.

BRIEF DESCRIPTION OF THE DRAWINGS

Various embodiments of the invention will be described with reference to the Figures, wherein:

FIGS. 2(a) and 2(b) are views showing an automatic speed change mechanism applied to the invention, in which FIG. 2(a) is a skeleton view of the automatic speed change mechanism and FIG. 2(b) is an operation table thereof;

DETAILED DESCRIPTION OF PREFERRED EMBODIMENTS

Figure 1:
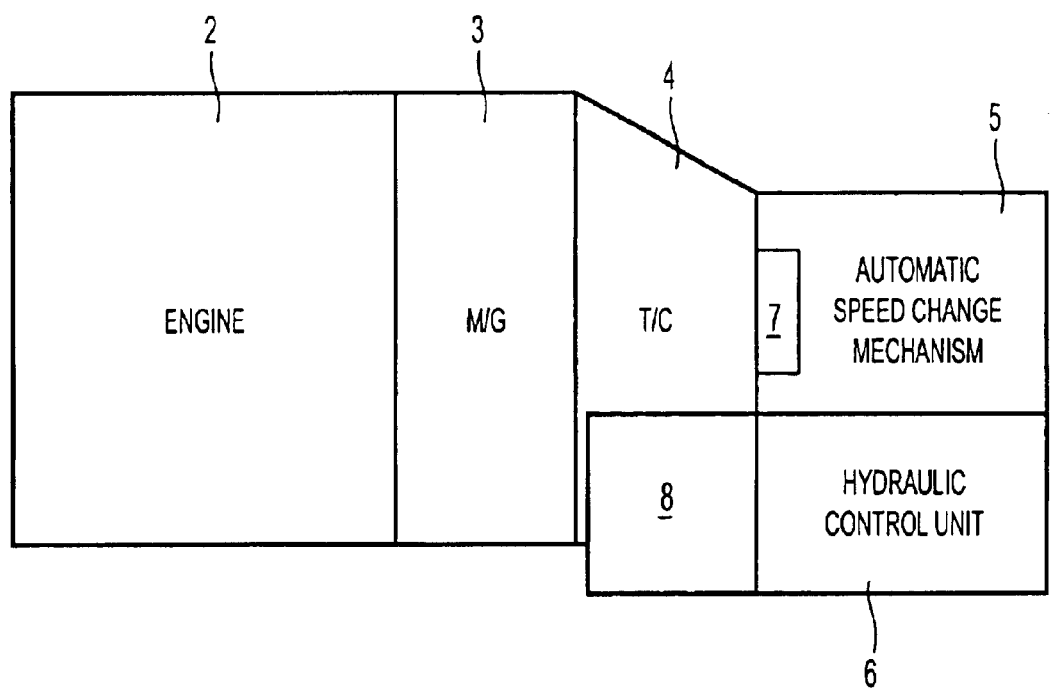
FIG. 1 is a block pattern diagram showing a driving system of a vehicle relating to the invention.
Figure 2A:
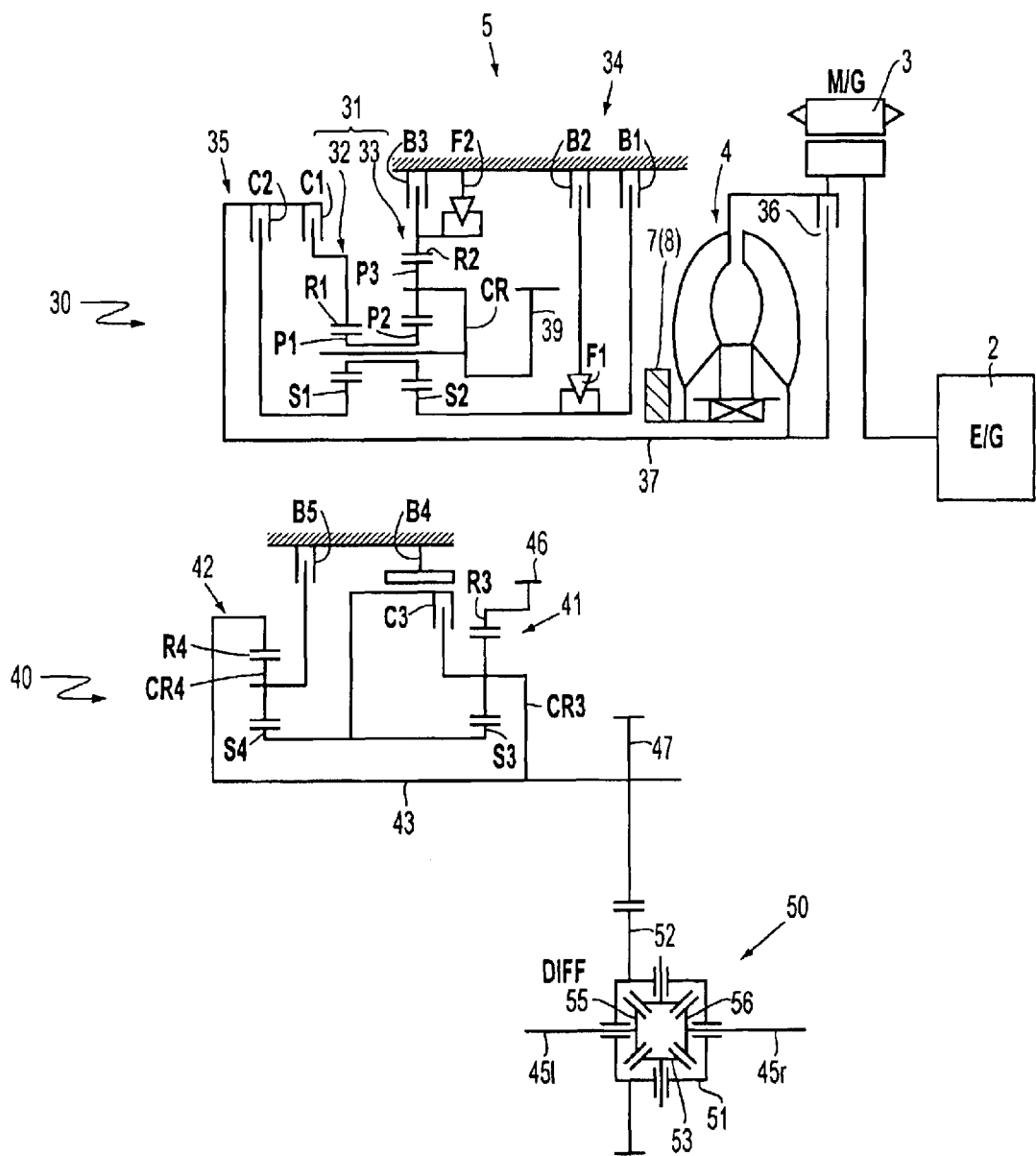
Figure 3:
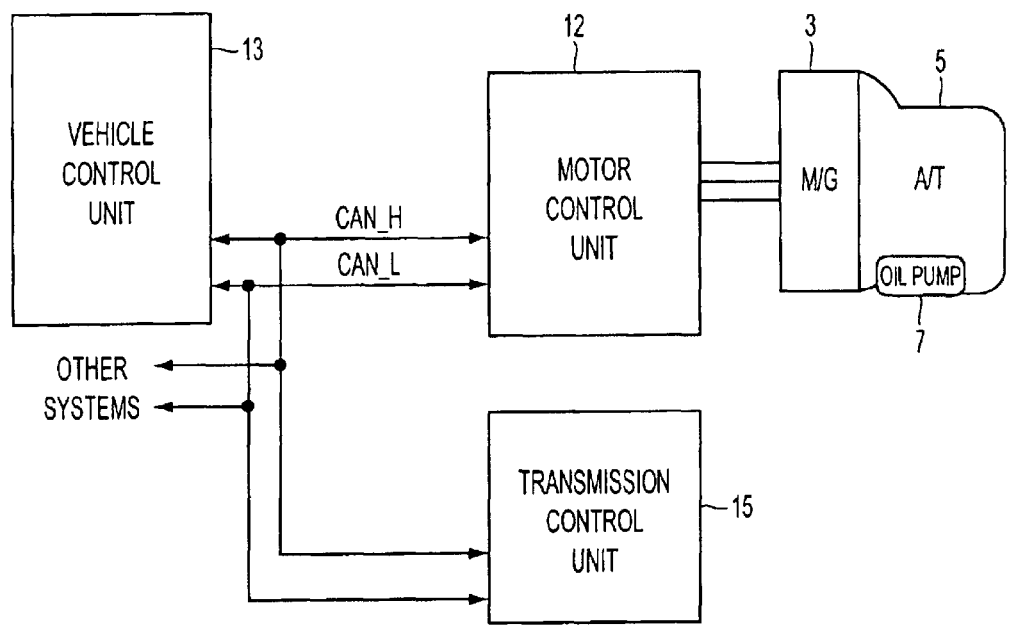
FIG. 3 is a block diagram showing a control system of a hybrid vehicle.
Figure 4:
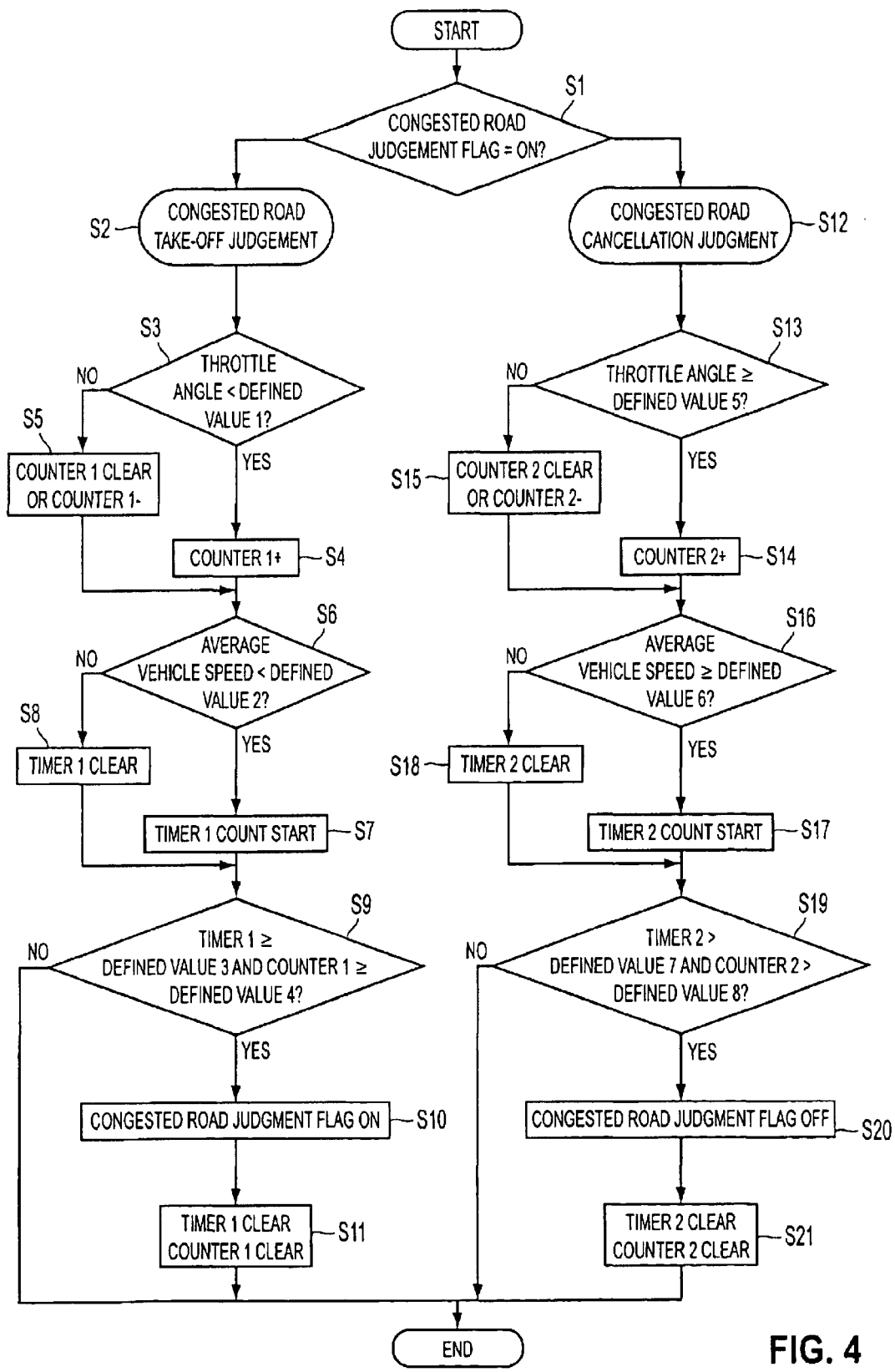
FIG. 4 is a flowchart showing one example of a congested road judgment program.
Figure 5:
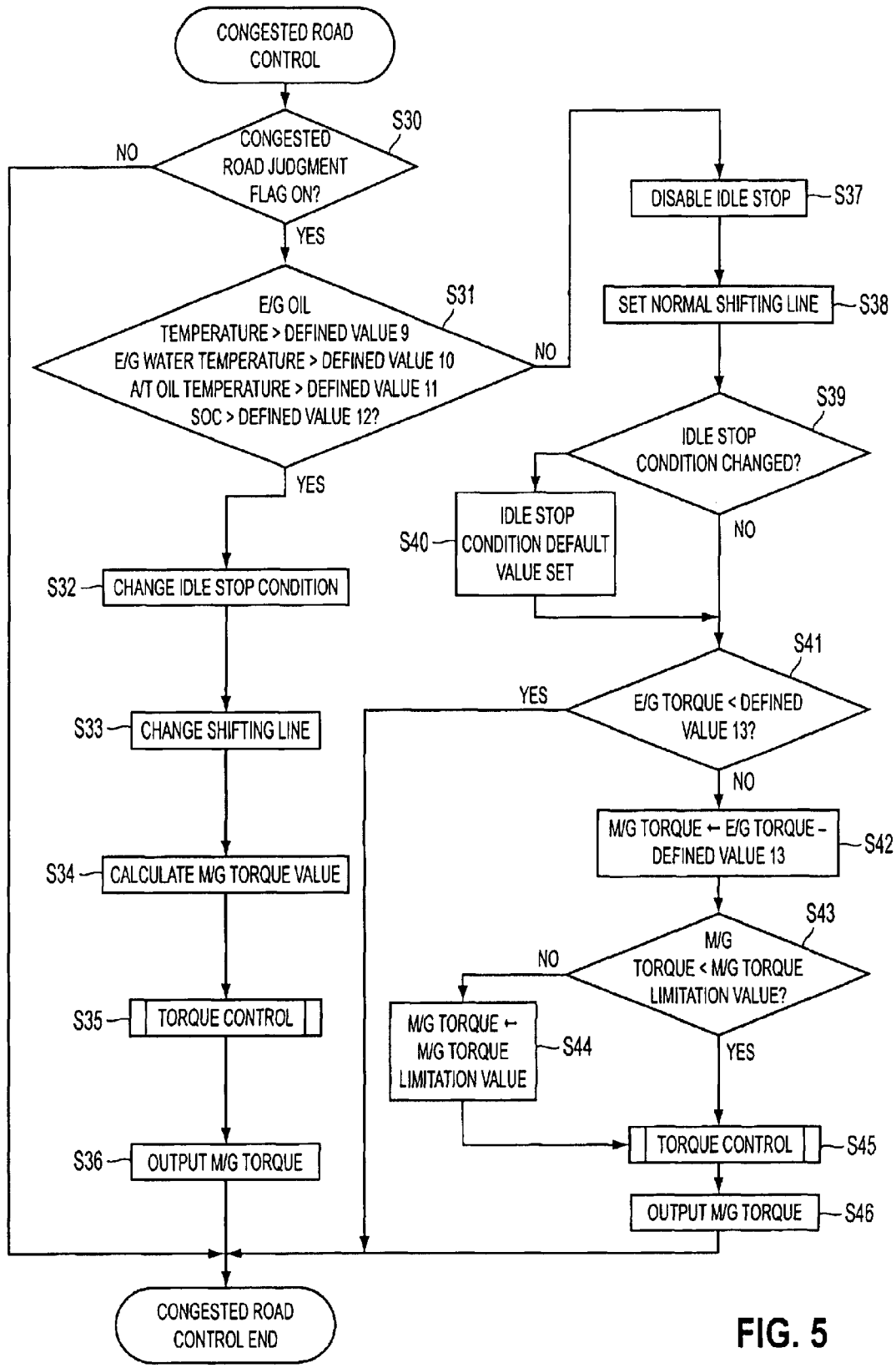
FIG. 5 is a flowchart showing one example of a congested road control program.
Figure 6:
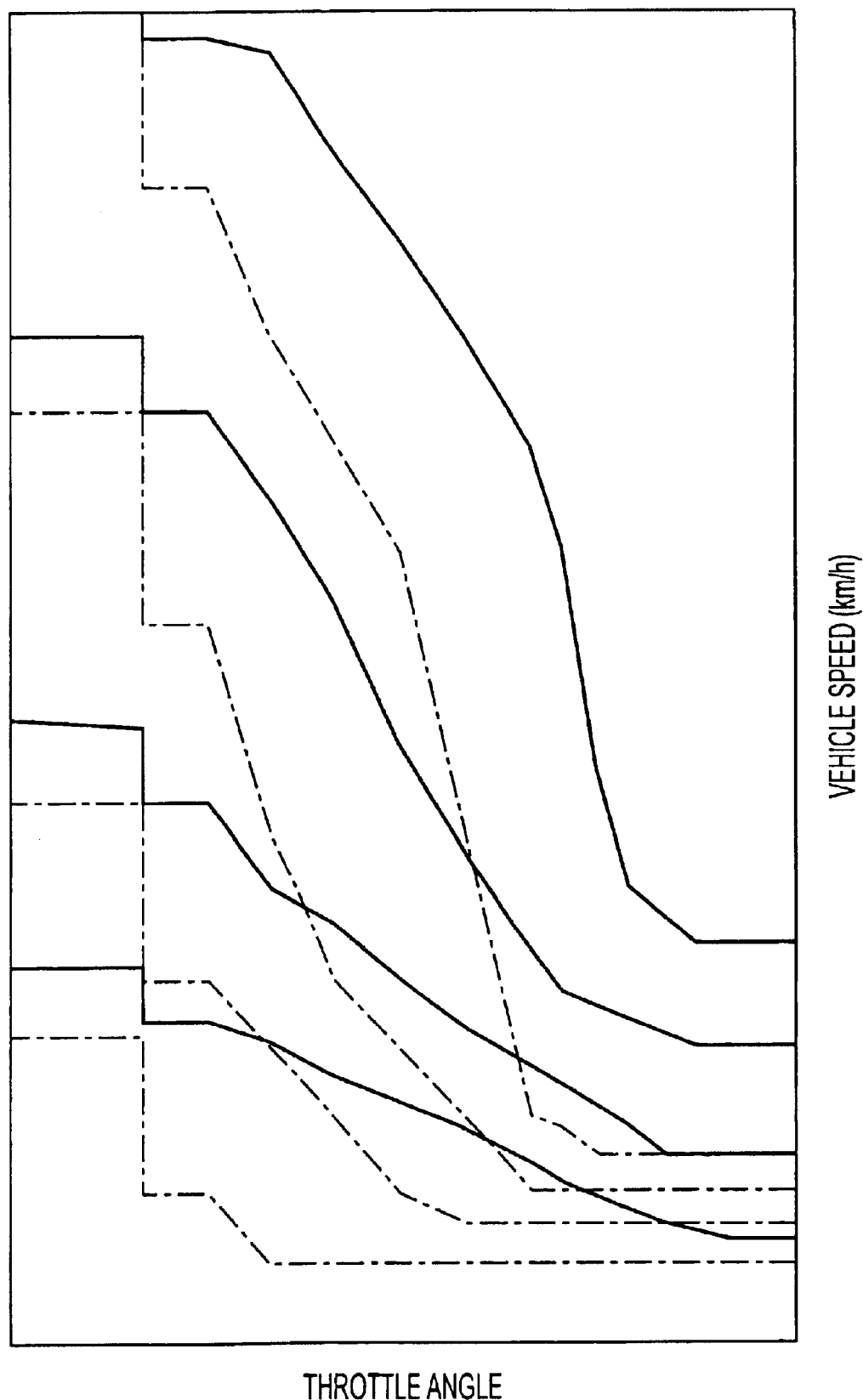
FIG. 6 is a view showing one example of a shifting line view.
Figure 7:
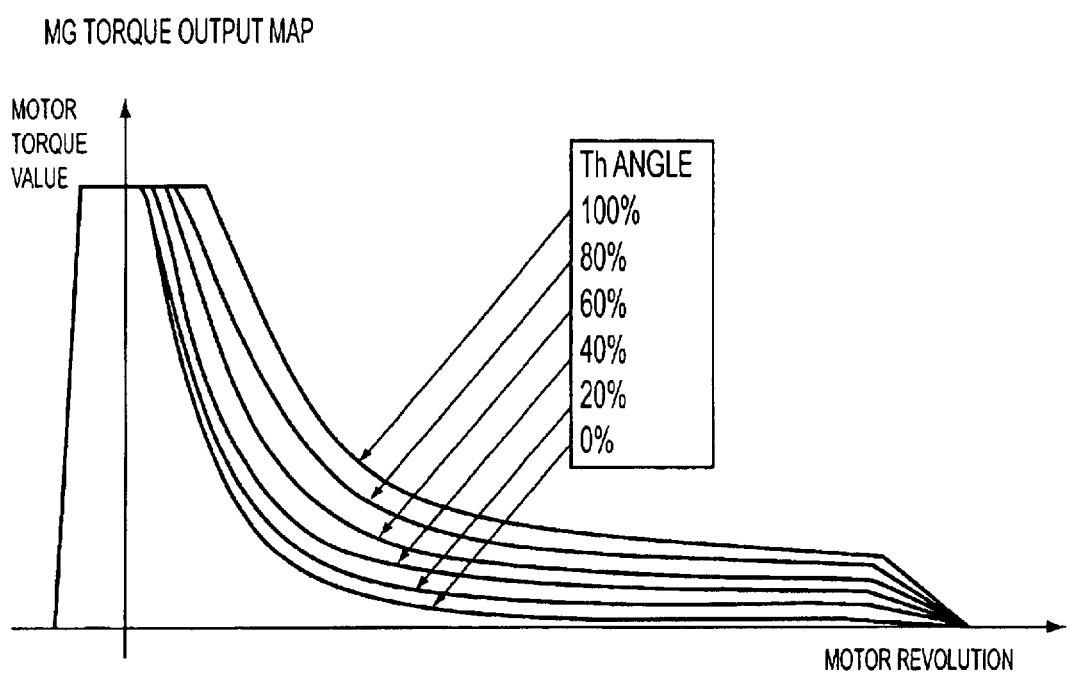
FIG. 7 is an output map showing a relation between a motor revolution and a motor torque value.
Figure 8:
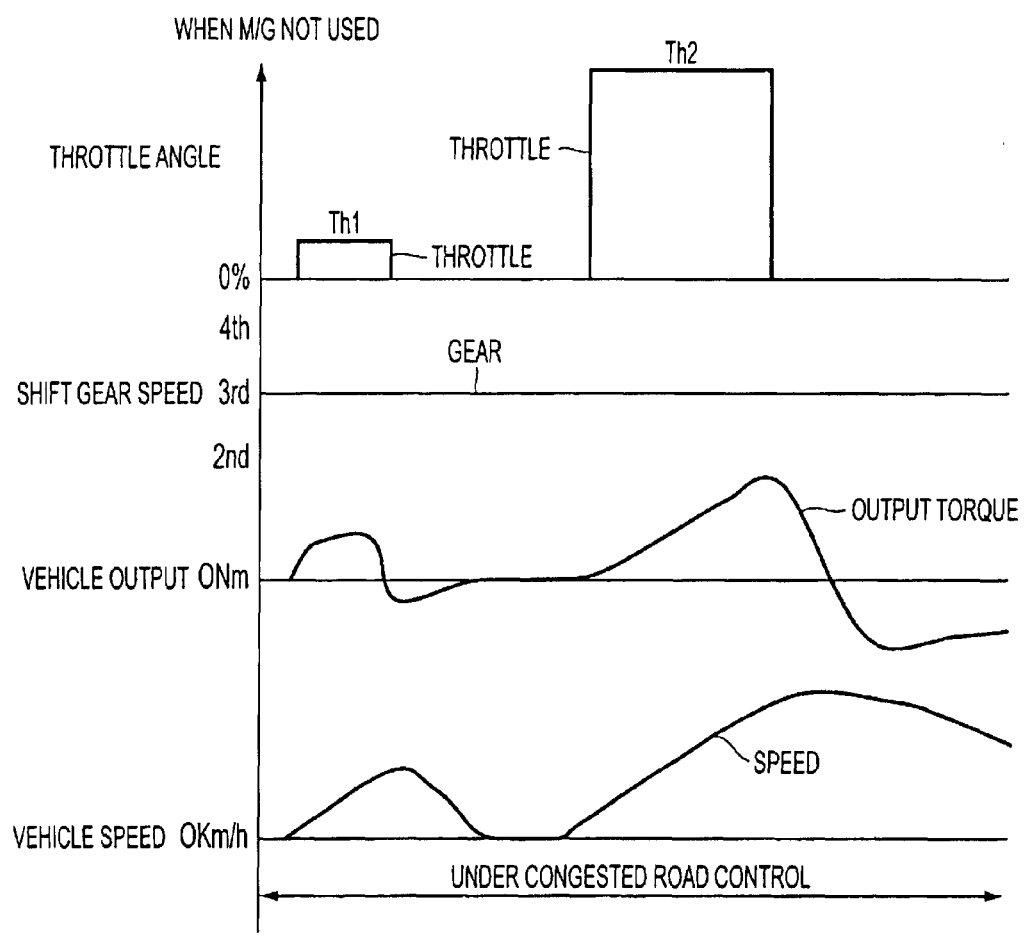
FIG. 8 is a view showing a relation of a throttle angle, a shift gear speed, a vehicle output and a vehicle speed when torque assist by a motor/generator is not used.
Figure 9:
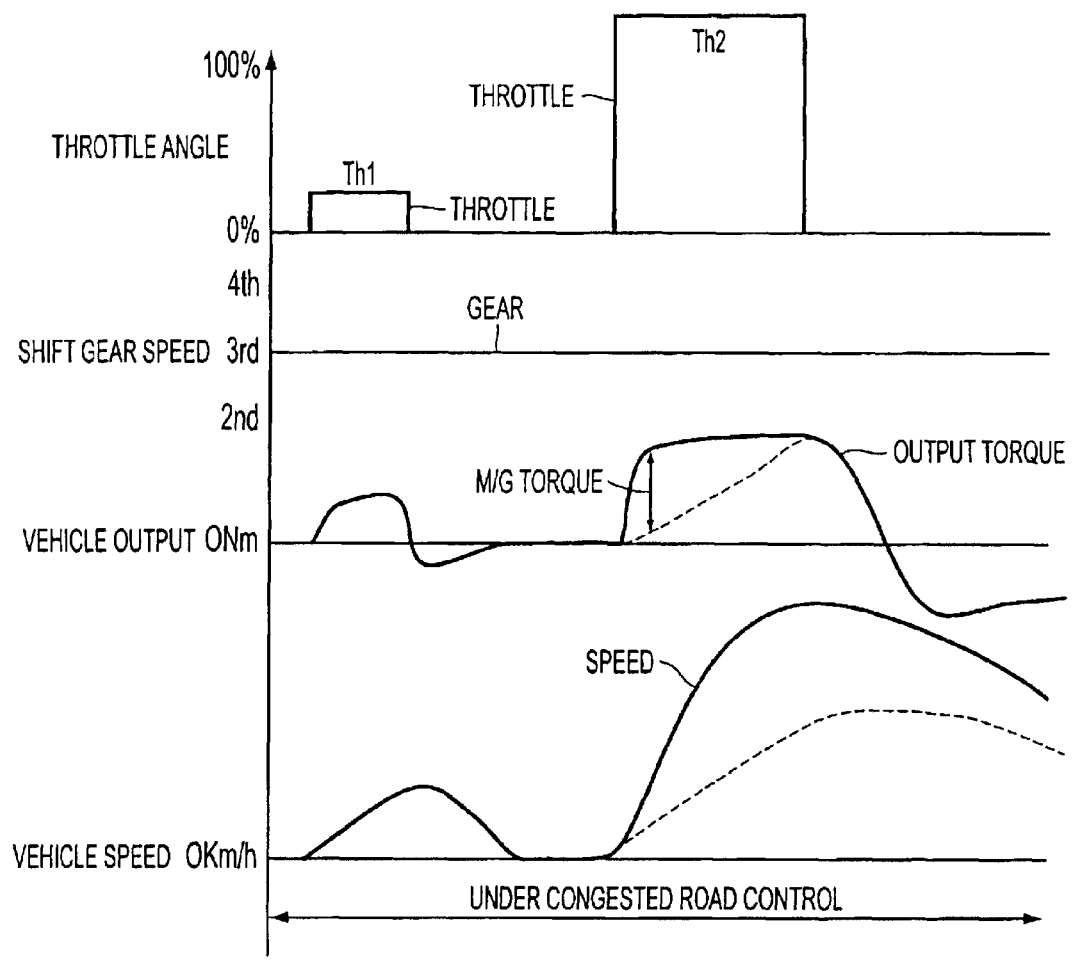
FIG. 9 is a view showing a relation of a throttle angle, a shift gear speed, vehicle output and a vehicle speed when torque assist by the motor/generator is used.
Figure 10:
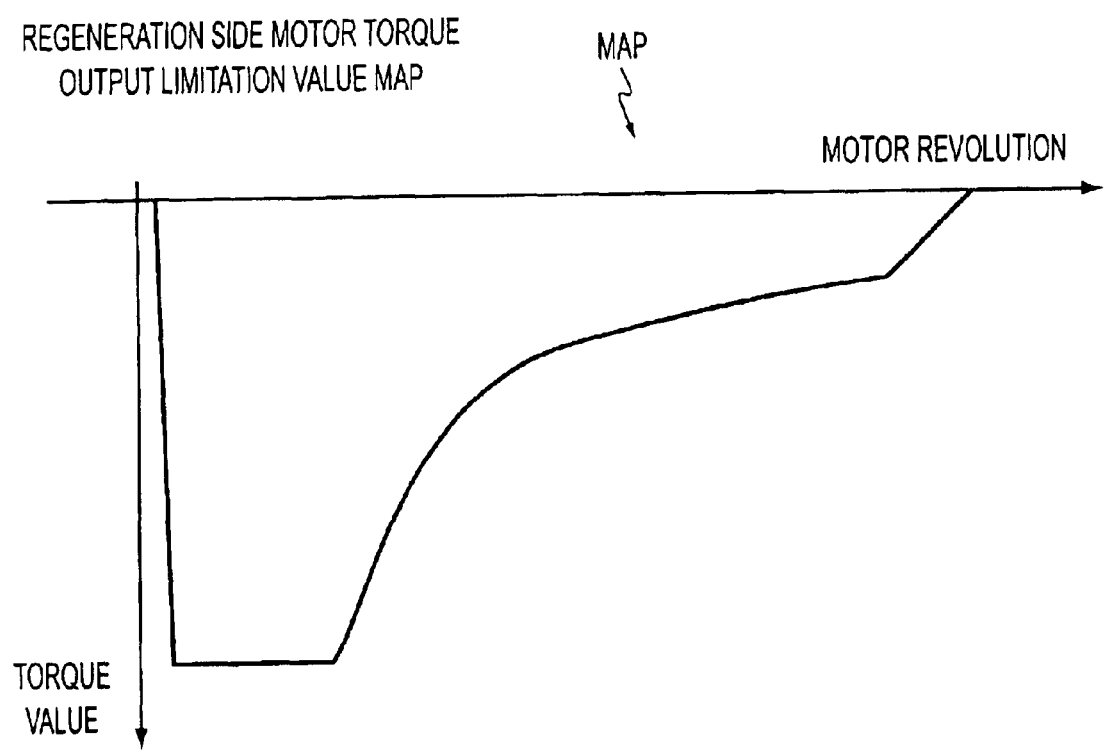
FIG. 10 is a map showing one example of a motor torque output limitation value on a regeneration side.
Figure 11:
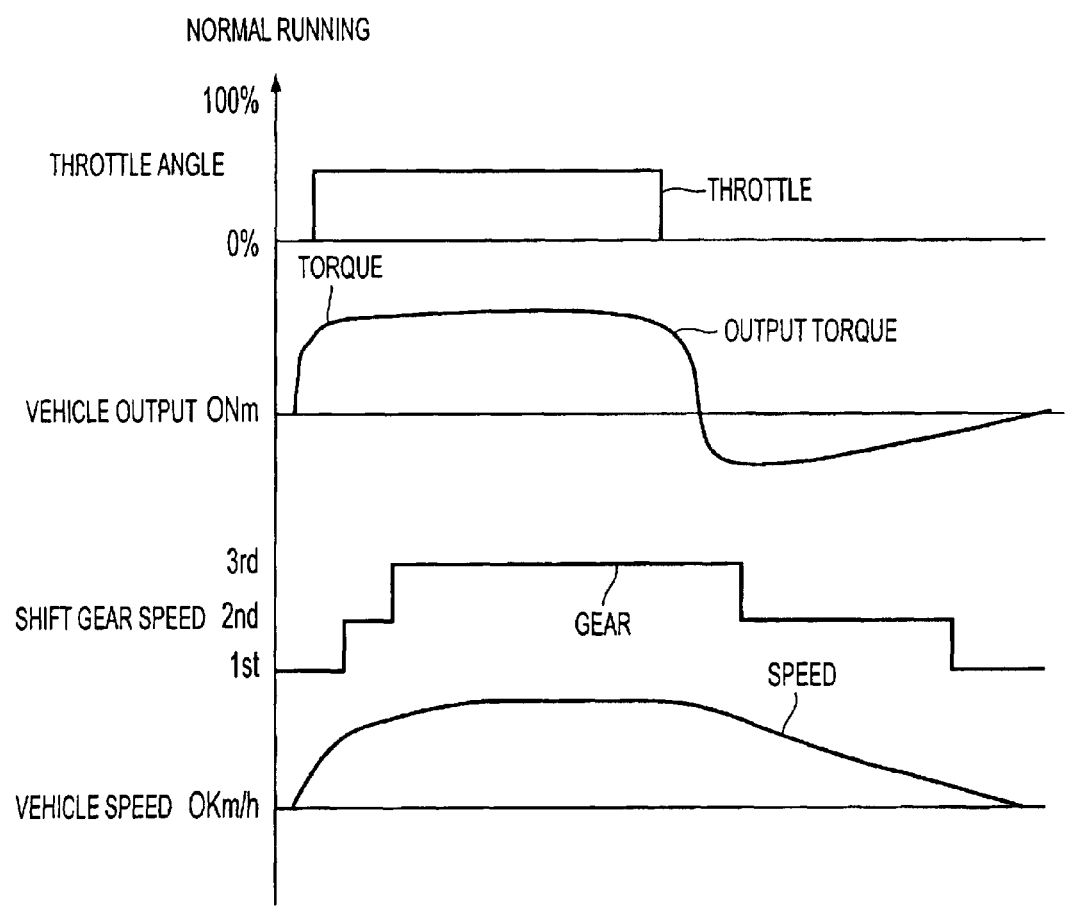
FIG. 11 is a view showing a relation of the throttle angle, the shift gear speed, the vehicle output and the vehicle speed at the time of normal running during which a regenerating operation is not carried out by the motor/generator.
Figure 12:
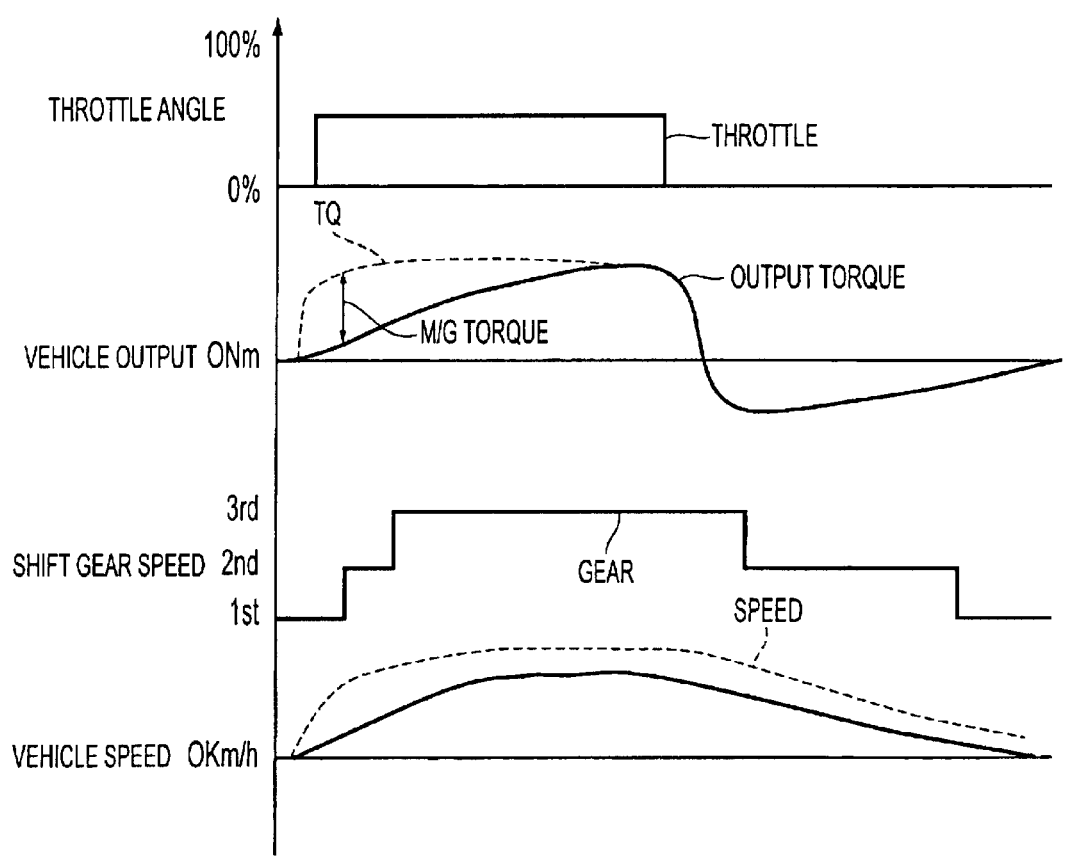
FIG. 12 is a view showing a relation of the throttle angle, the shift gear speed, the vehicle output and the vehicle speed at the time when the regenerating operation is carried out by the motor/generator.

Below, a first embodiment relating to the invention will be described with reference to the drawings. FIG. 1 is a block pattern diagram showing a driving system of a vehicle relating to the invention, FIGS. 2(a) and 2(b) are views showing an automatic speed change mechanism applied to the invention, in which FIG. 2(a) is a skeleton view of the automatic speed change mechanism and FIG. 2(b) is an operation table thereof, FIG. 3 is a block diagram showing a control system of a hybrid vehicle, FIG. 4 is a flowchart showing one example of a congested road judgment program, FIG. 5 is a flowchart showing one example of a congested road control program, FIG. 6 is a view showing one example of a shifting line view, FIG. 7 is an output map showing a relation between a motor revolution and a motor torque value, FIG. 8 is a view showing a relation of a throttle angle, a shift gear speed, a vehicle output and a vehicle speed when torque assist by a motor/generator is not used, FIG. 9 is a view showing a relation of a throttle angle, a shift gear speed, vehicle output and a vehicle speed when torque assist by the motor/generator is used, FIG. 10 is a map showing one example of a motor torque output limitation value on a regeneration side, FIG. 11 is a view showing a relation of the throttle angle, the shift gear speed, the vehicle output and the vehicle speed at the time of normal running during which a regenerating operation is not carried out by the motor/generator, FIG. 12 is a view showing a relation of the throttle angle, the shift gear speed, the vehicle output and the vehicle speed at the time when the regenerating operation is carried out by the motor/generator.

As shown in FIG. 1, a driving source of a hybrid vehicle consists of an engine 2 and a motor/generator (M/G) 3 which are mounted on a body. Output shafts are directly coupled to the engine 2 and the motor/generator 3 so that a driving force thereof is output to an automatic speed change mechanism 5 via a torque converter (T/C) 4 which forms an automatic transmission.

The automatic speed change mechanism 5, that is connected with the engine 2 and the motor/generator (M/G) 3 shown in FIG. 1, shifts an input driving force based on a specified vehicle running condition and outputs the driving force to wheels and so on. Moreover, in the automatic speed change mechanism 5, a plurality of friction engagement elements for shifting are positioned, and a hydraulic control unit 6 for shifting, through hydraulic control, the friction engagement elements and for controlling the aforementioned torque converter 4 is provided. A mechanical oil pump 7 and an electric oil pump 8 for supplying oil pressure to the hydraulic control unit 6 are positioned, respectively. The mechanical oil pump 7 is positioned so as to interlock the torque converter 4 and is driven by a driving force of the engine 2 and the motor/generator 3. Moreover, the electric oil pump 8 is independent from a driving force of the engine 2 and the motor/generator 3, and driven by a motor to which electric power is supplied from a battery (not shown).

Next, the automatic speed change mechanism will be described with reference to the drawings. FIGS. 2(a) and 2(b) are views showing the automatic speed change mechanism 5 applied to the present invention, in which FIG. 2(a) is a skeleton view of the automatic speed change mechanism 5 and FIG. 2(b) is an operation table thereof. As shown in FIG. 2(a), a main automatic speed change mechanism 30 is on a first shaft placed in line with an engine output shaft. The main automatic speed change mechanism 30 is also provided with an input shaft 37 to which a driving force is transmitted from the engine 2 (E/G) and the motor/generator (M/G) 3 via the torque converter 4 having a lock-up clutch 36. On the first shaft, the mechanical oil pump 7 and electric oil pump 8 adjacent to the torque converter 4, a brake portion 34, a planetary gear unit portion 31 and a clutch portion 35 are placed in this order.

The planetary gear unit portion 31 consists of a simple planetary gear 32 and a double-pinion planetary gear 33. The simple planetary gear 32 is composed of a sun gear S1, a ring gear R1, and a carrier CR supporting a pinion P1 meshed with the gears. The double-pinion planetary gear 33 is composed of a sun gear S2, a ring gear R2, and the carrier CR supporting a pinion P2 meshed with the sun gear S2 and a pinion P3 meshed with the ring gear R2 so as to mesh together. The sun gear S1 and the sun gear S2 are supported so as to be rotatable on a hollow shaft supported so as to be rotatable on the input shaft 37, respectively. Moreover, the carrier CR is common to both the planetary gears 32 and 33, and the pinion P1 and the pinion P2 meshed with the sun gears S1 and S2, respectively, are coupled so as to rotate in an integrated manner.

In the brake portion 34, a one-way clutch F1, a brake B1 and a brake B2 are positioned in this order from an inside diameter side to an outside diameter direction, and a counter drive gear 39 is coupled to the carrier CR via a spline. Also, a one-way clutch F2 is interposed between the ring gear R2 and a case, and a brake B3 is interposed between the outside periphery of the ring gear R2 and the case. In addition, the clutch portion 35 is provided with a forward clutch C1 and a direct clutch C2, the forward clutch C1 is interposed in the outside periphery of the ring gear R1, and the direct clutch C2 is interposed between the inside periphery of a moving member (not shown) and a flange portion coupled to a tip of the hollow shaft.

A secondary speed change mechanism 40 is positioned on a second shaft 43 placed in parallel with the first shaft made by the input shaft 37, and the first shaft and the second shaft are constructed like a triangle from the side view together with a third shaft made by differential shafts (left and right axles) 45l and 45r. The secondary speed change mechanism 40 has simple planetary gears 41 and 42, and a carrier CR3 and a ring gear R4 are coupled in an integrated manner and sun gears S3 and S4 are coupled to each other in an integrated manner, thereby constructing a Simpson type gear line. Also, the ring gear R3 is coupled to a counter driven gear 46 to construct an input portion, and the carrier CR3 and the ring gear R4 are coupled to a decelerating gear 47, which is an output portion. Furthermore, a UD direct clutch C3 is interposed between the ring gear R3 and the integrated sun gears S3 and S4, the integrated sun gear S3 (S4) can be locked by a brake B4 as necessary, and a carrier CR4 can be locked by a brake B5 as necessary. Consequently, the secondary speed change mechanism 40 is capable of obtaining shift speeds of three forward speeds.

Moreover, a differential unit 50 constructing the third shaft has a differential case 51, and a gear 52 meshed with the decelerating gear 47 is fixed to the case 51. Furthermore, inside the differential case 51, a differential gear 53 and left and right side gears 55 and 56 are mutually meshed and supported so as to be rotatable, and the left and right axles 45l and 45r are extended from the left and right side gears. Consequently, rotation from the gear 52 is branched in response to load torque, and transmitted to left and right front wheels via the left and right axles 45l and 45r.

Next, an operation of the automatic speed change mechanism 5 will be described with the operation table shown in FIG. 2(b). In the first (1ST) state, the forward clutch C1, the one-way clutch F2 and the brake B5 are engaged. Consequently, when the main speed change mechanism 30 comes to the $1^{ST}$ state, and the deceleration rotation is transmitted to the ring gear R3 in the secondary speed change mechanism 40 via the counter gears 39 and 46. The secondary speed change mechanism 40 is in the 1ST state as a result of the carrier CR4 being stopped by the brake B5, and the deceleration rotation of the main speed change mechanism 30 is further decelerated by the secondary speed change mechanism 40 and transmitted to the axles 45l and 45r via the gears 47 and 52 and the differential unit 50.

In the second (2ND) state, other than the forward clutch C1, the brake B2 is engaged, and the one-way clutch F2 smoothly switches to the one-way clutch F1, whereby the main speed change mechanism 30 comes to the 2ND state. Moreover, the secondary speed change mechanism 40 is in the 1ST state because of engagement of the brake B5, and by the combination of the 2ND state and the 1ST state, the 2ND state can be obtained in the entire automatic speed change mechanism 5.

In the third (3RD) state, the main speed change mechanism 30 is in the same state as the aforementioned 2ND state in that the forward clutch C1, the brake B2 and the one-way clutch F1 are engaged. However, in the $3^{RD}$ state, the secondary speed change mechanism 40 engages the brake B4. Then, the sun gears S3 and S4 are fixed, and the rotation from the ring gear R3 is output from the carrier CR3 as the 2ND state, so that the 3RD state can be obtained in the entire automatic speed change mechanism 5 from the 2ND state of the main speed change mechanism 30 and the 2ND state of the secondary speed change mechanism 40.

In the fourth (4TH) state, the main speed change mechanism 30 is in the same state as the aforementioned 2ND and 3RD states in which the forward clutch C1, the brake B2 and the one-way clutch F1 are engaged. However, in the 4TH state, the secondary speed change mechanism 40 releases the brake B4 and engages the UD direct clutch C3. In this state, the ring gear R4 and the sun gear S3 (S4) are coupled and both the planetary gears 41 and 42 directly rotate in an integrated manner. Therefore, the 2ND state of the main speed change mechanism 30 and direct coupling (3RD) state of the secondary speed change mechanism 40 are combined, whereby the 4TH state can be obtained in the entire automatic speed change mechanism 5.

In the fifth (5TH) state, the forward clutch C1 and the direct clutch C2 are engaged, and rotation of the input shaft 37 is transmitted to both the ring gear R1 and the sun gear S1, whereby the gear unit 31 of the main speed change mechanism 30 directly rotates in an integrated manner. Moreover, the secondary speed change mechanism 40 is in direct rotation with the UD direct clutch C3 engaged, so that the 3RD state (direct coupling) of the main speed change mechanism 30 and the 3RD state (direct coupling) of the secondary speed change mechanism 40 are combined, and the 5TH state can be obtained in the entire automatic speed change mechanism 5.

In a reverse (REV) state, in addition to the direct clutch C2 and the brake B3, the brake B5 is engaged as well. In this state, reverse rotation is produced in the main speed change mechanism 30, and the secondary speed change mechanism 40 is maintained in the 1ST state as a result of the carrier CR4 stopping based on the brake B5. Therefore, reverse rotation of the main speed change mechanism 30 and the 1ST state of the secondary speed change mechanism 40 are combined, whereby reverse deceleration rotation can be obtained.

In FIG. 2(b), a triangle mark shows operation at the time of engine brake. More specifically, in the 1ST state, the brake B3 is engaged, thereby fixing the ring gear R2 instead of the one-way clutch F2. In the 2ND, 3RD and 4TH states, the brake B1 is engaged, thereby fixing the sun gear S2 instead of the one-way clutch F1.

Moreover, as shown in FIG. 3, a motor control unit 12 which controls the motor/generator 3 is connected to the vehicle, and a vehicle control unit 13, a transmission control unit 15 and so on are connected to the motor control unit 12.

Since the hybrid vehicle has a construction as described above, while the vehicle is running, the vehicle control unit executes a congested road judgment program JJP shown in FIG. 4 at all times, judges whether a present running state is a congested road running or not, and, in the case of judging as currently running on a congested road, executes a congested road control program JCP described later.

More specifically, at step S1 of the congested road judgment program JJP, it is judged whether a congested road judgment flag is ON. Since an initial value of the congested road judgment flag is normally OFF, a congested road judgment operation is started at step S2. At step S3, it is judged whether a throttle angle is less than a defined value '1'. For a case in which the throttle angle is less than the defined value '1', that is, a low throttle angle, a counter '1' is incremented by one at step S4, and for a case in which the throttle angle is equal to or more than the defined value '1', that is, not a low throttle angle, the counter '1' is decremented by one or cleared at step S5.

Next, at step S6, it is judged whether a present average vehicle speed is less than a defined value '2'. For a case in which a present average vehicle speed is less than the defined value '2', that is, in the case of low-speed running, the count of a timer '1' is started at step S7, and for a case in which a present average vehicle speed is equal to or more than the defined value '2', that is, in the case when not low-speed running, the count of the timer '1' is cleared at step S8.

Next, at step S9, it is judged whether the timer '1' is equal to or more than a defined value '3' and whether the counter '1' is equal to or more than a defined value '4'. For a case in which the timer '1' is equal to or more than the defined value '3' and the counter '1' is equal to or more than the defined value '4', that is, for a case in which a low throttle angle for which the throttle angle is less than the defined value '1' has continued to some extent and a low vehicle speed state for which an average vehicle speed is less than the defined value '2' has continued for a specified time or more, the congested road judgment flag is turned ON and a present running state of the vehicle is judged as congested road running at step S10. The congested road judgment program JJP clears the timer '1' and the counter '1' at step S11, and makes ready for re-execution of the congested road judgment program JJP.

Moreover, for a case in which the congested road judgment flag is ON at step S1 (a case in which the congested road judgment program JJP has already been executed and the congested road judgment flag is turned ON at step S10), a congested road cancellation judgment operation is started at step S12. More specifically, for a case in which the congested road judgment flag is turned ON once at steps S2 to S11, an ON state of the congested road judgment flag is maintained until a running state of the vehicle is judged as no longer being congested road running in the congested road cancellation judgment operation described later.

At step S13, it is judged whether the throttle angle is equal to or more than a defined value '5'. For a case in which the throttle angle is equal to or more than the defined value '5', that is, a high throttle angle which is higher than the specified throttle angle, a counter '2' is incremented by one at step S14. For a case in which the throttle angle is less than the defined value '5', that is, a low throttle angle which is lower than the specified throttle angle, the counter '2' is decremented by one or cleared at step S15.

Next, at step S16, it is judged whether a present average vehicle speed is equal to or more than a defined value '6'. For a case in which the present average vehicle speed is equal to or more than the defined value '6', that is, in the case of high-speed running at a specified speed or more, the count of a timer '2' is started at step S17. For a case in which the present average vehicle speed is less than the defined value '6', that is, in the case of low-speed running at the specified speed or less, the count of the timer '2' is cleared at step S18.

Next, at step S19, it is judged whether the timer '2' is over a defined value '7' and the counter '2' is over a defined value '8'. For a case in which the timer '2' is equal to or more than the defined value '7' and the counter '2' is equal to or more than the defined value '8', that is, for a case in which a high throttle angle for which a throttle angle is equal to or more than the defined value '7' has continued to some extent and a high vehicle speed state for which an average vehicle speed is equal to or more than the defined value '8' has continued for a specified time or more, the congested road judgment flag is turned OFF and a present running state of the vehicle is judged as being out of congested road running and coming to a normal running state at step S20. The congested road judgment program JJP clears the timer '2' and the counter '2' at step S21, and makes ready for re-execution of the congested road judgment program JJP.

Thus, for a case in which the congested road judgment program JJP is executed and the congested road judgment flag is turned ON, the vehicle control unit 13 executes the congested road control program JCP shown in FIG. 5.

The congested road control program JCP, at step S30, checks whether the congested road judgment flag is ON. At step S31, the program JCP judges whether an oil temperature of the engine 2 is equal to or more than a defined value '9' (a temperature at which an engine oil temperature reaches a normal temperature: for example, about 30° C.), whether a water temperature of the engine 2 is equal to or more than a defined value '10' (a temperature at which an engine water temperature reaches a normal temperature: for example, about 30° C.), whether an oil temperature of the automatic speed change mechanism 5 is equal to or more than a defined value '11' (a temperature at which the oil temperature of the automatic speed change mechanism reaches a normal temperature: for example, about 30° C.) and whether an SOC of the battery is equal to or more than a defined value '12' (a degree that torque assist described later can be performed several times at the time of idle stop control: for example, about 40%), that is, judges a state of a driving portion of the hybrid vehicle.

In other words, for a case in which the oil temperature of the engine 2 is over the defined value '9', the water temperature of the engine 2 is over the defined value '10', the oil temperature of the automatic speed change mechanism 5 is over the defined value '11' or the SOC of the battery is over the defined value '12', the engine 2 is in a normal running state, and a charge capacity of the battery driving the motor/generator 3 is sufficient, so that a busy-shifting prevention operation by torque assist using the motor/generator 3 described later is performed. Moreover, at step S31, a case where the oil temperature of the engine 2 is equal to or less than the defined value '9', the water temperature of the engine 2 is equal to or less than the defined value '10', the oil temperature of the automatic speed change mechanism 5 is equal to or less than the defined value '11' or the SOC of the battery is equal to or less than the defined value '12' (it is preferable to use AND/OR of a forming condition of these parameters in combination as necessary according to a condition of the vehicle) is a case where warming-up is necessary because the engine 2 and the automatic speed change mechanism 5 have just been actuated and so on. Furthermore, a case where the SOC of the battery is low and torque assist by the use of the motor/generator 3 cannot be sufficiently performed, so that control is executed in a manner that warming-up of the engine 2 and a charging operation to increase the SOC of the battery take priority over a busy-shifting prevention operation, will be described later.

More specifically, when performing a busy-shifting prevention operation by torque assist using the motor/generator 3 at step S31, conditions at the time of idle stop are changed at step S32. In other words, various kinds of parameters during idle stop which stops the engine 2 when the vehicle stops and stops the idling of engine 2 are changed, in consideration of congested conditions, so that the engine is as difficult to start as possible and the vehicle can run using the motor/generator 3 when it begins to move. Specifically, for example, an actuation condition of the engine 2 is changed from a vehicle speed of 0 Km/h to 10 Km/h, and actuation of the engine 2 by brake-off is stopped.

Next, at step S33, a shifting line is changed from a state of a solid line shown in FIG. 6 to a state of a dashed line so that shifting at a low vehicle speed is performed during congested conditions and output torque from the driving source (the engine or the motor/generator) becomes small. Instead of changing the shifting line, downshift to a lower speed may be disabled (for example, a downshift disabling region may be changed in response to a vehicle speed in such a manner so that downshift to 2ND or lower, 3RD or lower, or 4TH or lower is disabled).

Next, at step S34, output torque of the motor/generator 3 that corresponds to the throttle angle and the motor/generator revolution is found from a torque output map of the motor/generator shown in FIG. 7. When the throttle angle and a revolution of the engine 2 (that is, a revolution of the motor/generator 3) at present are ascertained from this output map, torque to be assisted by the motor/generator 3 is immediately ascertained. Regarding output of the motor/generator 3, from the throttle angle and the vehicle speed, or only from the throttle angle, output torque may be found by the use of specified maps, respectively.

Next, at steps S35 and S36, the motor control unit 12 is directed to perform torque assist to the engine 2. More specifically, for example, as shown in FIG. 8, both for a case in which a throttle angle becomes Th1 and for a case in which the throttle angle becomes Th2, which is larger than Th1 as a result of the throttle being actuated in a congested road judgment flag ON state, as described regarding step S33, the congested road judgment flag is ON. Therefore, a downshift is disabled by the transmission control unit 15, and the shift speed is fixed to the 3RD state, which is a high shift speed (that is, a state in which the gear ratio is large). Despite a take-off in the 3RD state regardless of the throttle angle, the take-off at low torque is slow because the take-off is on a congested road.

In the case of a small throttle angle Th1, a driver is not intending to rapidly accelerate the vehicle, and therefore, there is no problem with rotating only the engine 2 and taking-off in such a manner. Also in this case, based on the output map shown in FIG. 7, the torque assist may be performed by driving the motor/generator 3.

Figure 18:
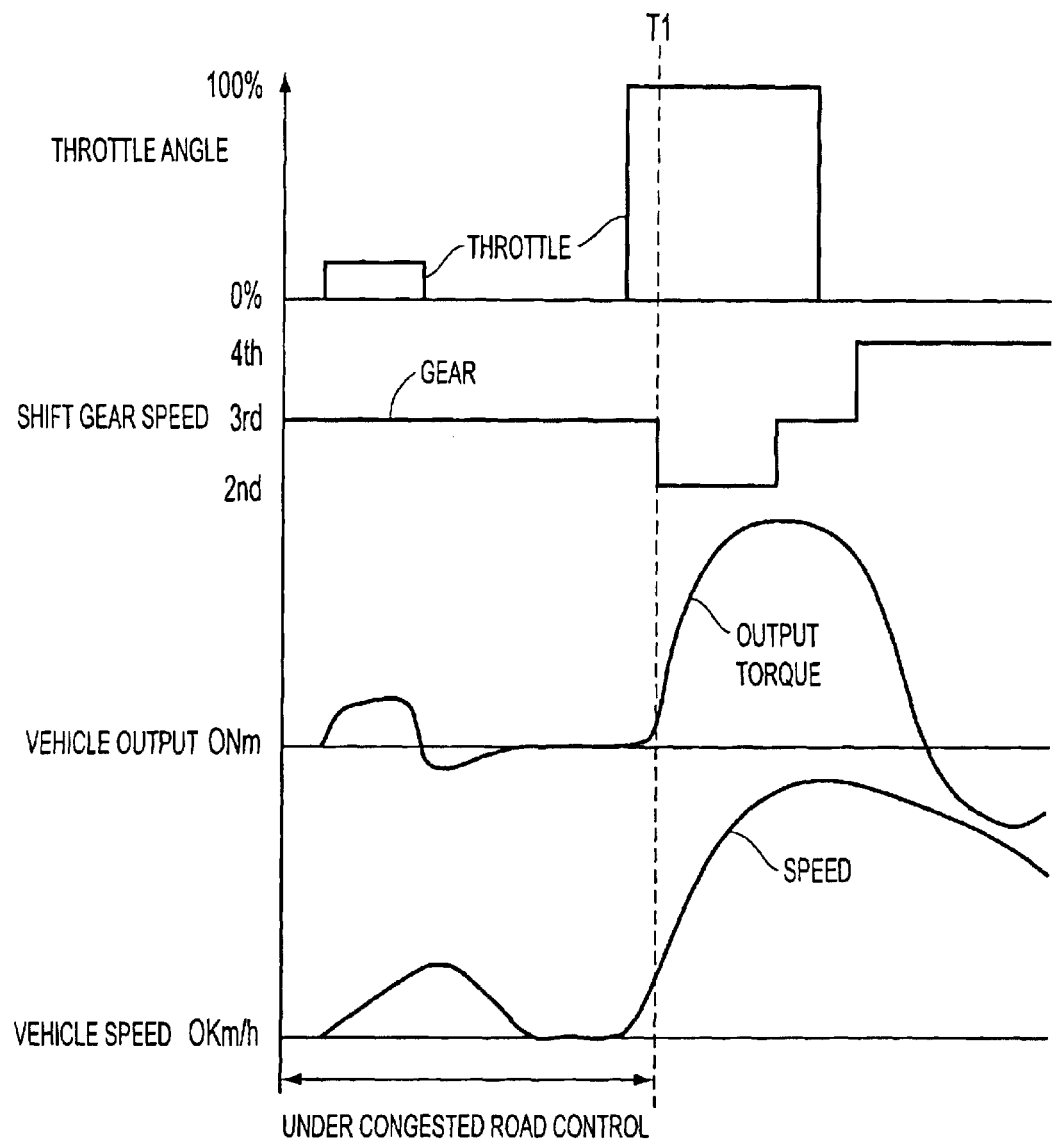
FIG. 18 is a time chart showing one example of control at the time of throttle actuation under downshift disabling control on a congested road.

Moreover, in the case of a larger throttle angle Th2, the driver temporarily requires a large torque and desires a rapid take-off, whereas with rotation of only the engine 2, output torque OutPutTrq has a smooth gradient and a vehicle speed Speed shows slow acceleration as shown in FIG. 8. Under such circumstances, compared with the conventional control method of canceling congested road control as shown in FIG. 18, output torque is largely weakened, and the driver feels a sense of discomfort.

Therefore, for a case in which the throttle angle reaches a value larger than a specified value, the motor control unit 12 immediately performs torque assist to the engine 2 based on the output map shown in FIG. 7, and outputs only a part of the torque M/G Trq corresponding to a part of the under torque to the automatic speed change mechanism 5 side as shown in FIG. 9. Consequently, the output torque OutPutTrq of the vehicle largely increases from the time of throttle actuation as shown by a solid line in FIG. 9, and concomitantly, the vehicle speed Speed also rapidly increases, so that, regardless that the shift speed is fixed at the 3RD state because downshift is disabled, it is possible to provide an acceleration feeling intended by the driver.

Thus, by performing torque assist by the motor/generator 3, it is possible without canceling congested road control to quickly meet a temporary torque request at a low torque output state where the vehicle is in a downshift disabling state (or, a state where the shifting line is changed to a low speed side). Furthermore, since the low torque output state of the vehicle is maintained, it is possible to continue congested road control. That is, a take-off operation from a high shift speed is maintained until a jam state continues, and it is possible to prevent busy shifting and an occurrence of a sense of jumping out as in a take-off from a normal low shift speed (that is, a state where the gear ratio is small). By increasing the amount of torque assist by the motor/generator 3, it is possible to set a shift speed used for a take-off to a higher speed, and it is possible to further prevent busy shifting.

Moreover, at step S31, a case where the oil temperature of the engine 2 is equal to or less than the defined value '9', or the water temperature of the engine 2 is equal to or less than the defined value '10', or the oil temperature of the automatic speed change mechanism 5 is equal to or less than the defined value '11', or the SOC of the battery is equal to or less than the defined value '12' is a case where warming-up is necessary because the engine 2 and the automatic speed change mechanism 5 have just been actuated. Furthermore, when the SOC of the battery is low and torque assist by the use of the motor/generator 3 cannot be sufficiently carried out, control is executed in such a manner that warming-up of the engine 2 and the charging operation to increase the SOC of the battery take priority over a busy-shifting prevention operation.

Thereby, at step S37, idle stop control for stopping the engine 2 when the vehicle stops is disabled, and the charging operation of the battery takes priority. This step may not be executed for a case in which the amount of the SOC of the battery is sufficient. Next, at step S38, for a case in which the shifting line is changed to the low output torque side because of execution of step S33 and so on described before, the setting of the shifting line is brought back to a normal shifting line shown by the solid line of FIG. 6. For a case in which downshift to a lower speed is disabled at step S33 and so on, the disabling is canceled, and a normal shifting state is returned.

Next, at step S39, for a case in which the conditions of an idle stop are changed at step S32 and so on, conditions of normal idle stop are restored at step S40, whereby the engine is set to easily start from when stopped, and the motor/generator 3 is set so as not to be used when possible. For a case in which idle stop is disabled at step S37, this step is meaningless, and therefore, skipped.

When the running state of the vehicle is thus returned from a state of congested road control to a normal running state in the shifting line and idle stop control, it is judged at step S41 whether present engine torque is more than a defined value '13'. This defined value '13' is a torque value at which there is no jump-out torque, and is the value of the output torque when in the 3RD state. For a case in which present engine torque is less than the defined value '13' and there is no jump-out torque, there is no wasteful torque production from the engine. It is thus impossible to use such jump-out torque and use the motor/generator 3 for a regenerating operation, so the congested road control program JCP is ended.

Moreover, when the present engine torque is over the defined value '13' and there is some jump-out torque at step S41, a value of the defined value '13', that is, a part of the torque necessary for moving the vehicle is derived from the present engine torque and a part of the jump-out torque which does not contribute to movement of the vehicle is calculated as motor/generator (M/G) torque at the time of regenerating the motor/generator 3 at step S42.

At step S43, regarding the motor/generator (M/G) torque found at step S42, it is judged whether the torque exceeds a torque limitation value of the motor/generator, referring to a regeneration side motor torque output limitation value map MAP shown in FIG. 10. For a case in which the motor/generator (M/G) torque is over the torque limitation value of FIG. 10, the motor/generator (M/G) torque at the time of regeneration is set as a torque limitation value at step S44. Then, at steps S45 and S46, a control operation of the output torque of the vehicle is started, and a regenerating operation by the motor/generator 3 is performed.

In this case, as shown in FIG. 11, when the driver actuates the throttle, the automatic transmission is caused to perform a normal shifting operation by the transmission control unit 15, the take-off is performed from the 1ST state, output torque OutPutTrq including jump-out torque TQ with rapid torque increase is observed at the axels 45l and 45r. For a case in which torque control is not performed by the motor/generator 3, the vehicle speed is rapidly accelerated from a stopped state, and a good driving feeling is not necessarily produced on a congested road where high acceleration is unnecessary. However, in a state where the water temperature and the oil temperature of the engine and the oil temperature in the automatic transmission are low, because the engine rotates at a high output, warming-up can be performed.

In the case of using the motor/generator 3 in a regenerating operation so as to absorb jump-out torque TQ as shown in FIG. 12, extra jump-out torque TQ is consumed for a power generating operation of the motor/generator 3 so as to contribute to the improvement of the SOC of the battery. Also, when the part of jump-out torque TQ is consumed by the motor/generator 3, a vehicle speed rises slowly from a stopped state as shown by a solid line in the drawing, and the vehicle can take-off in such a behavior as if taking-off at a high shift speed suitable for running on a congested road. Moreover, it is possible to continue to perform a warming-up operation of the engine, and it is possible to obtain a good driving state. Since the battery is consequently charged, it is possible to decrease the need to actuate the engine in order to charge the battery at the time of idle stop control thereafter, and perform idle stop control effectively.

Subsequently, an embodiment in which the above embodiment is partly changed will be described with reference to the drawings. The aforementioned automatic speed change mechanism is a stepped speed change mechanism 5 which forms five forward speeds and one reverse speed by the engagement states of the clutches C1 to C3, the brakes B1 to B5 and the one-way clutches F1 and F2, for example, whereas in the embodiment described below, a continuously variable speed change mechanism 5' which shifts by a belt and pulleys is applied to the invention as an automatic speed change mechanism. In the following description, description of the same parts as described in the aforementioned embodiment, except partial changes, will be omitted.

Figure 13:
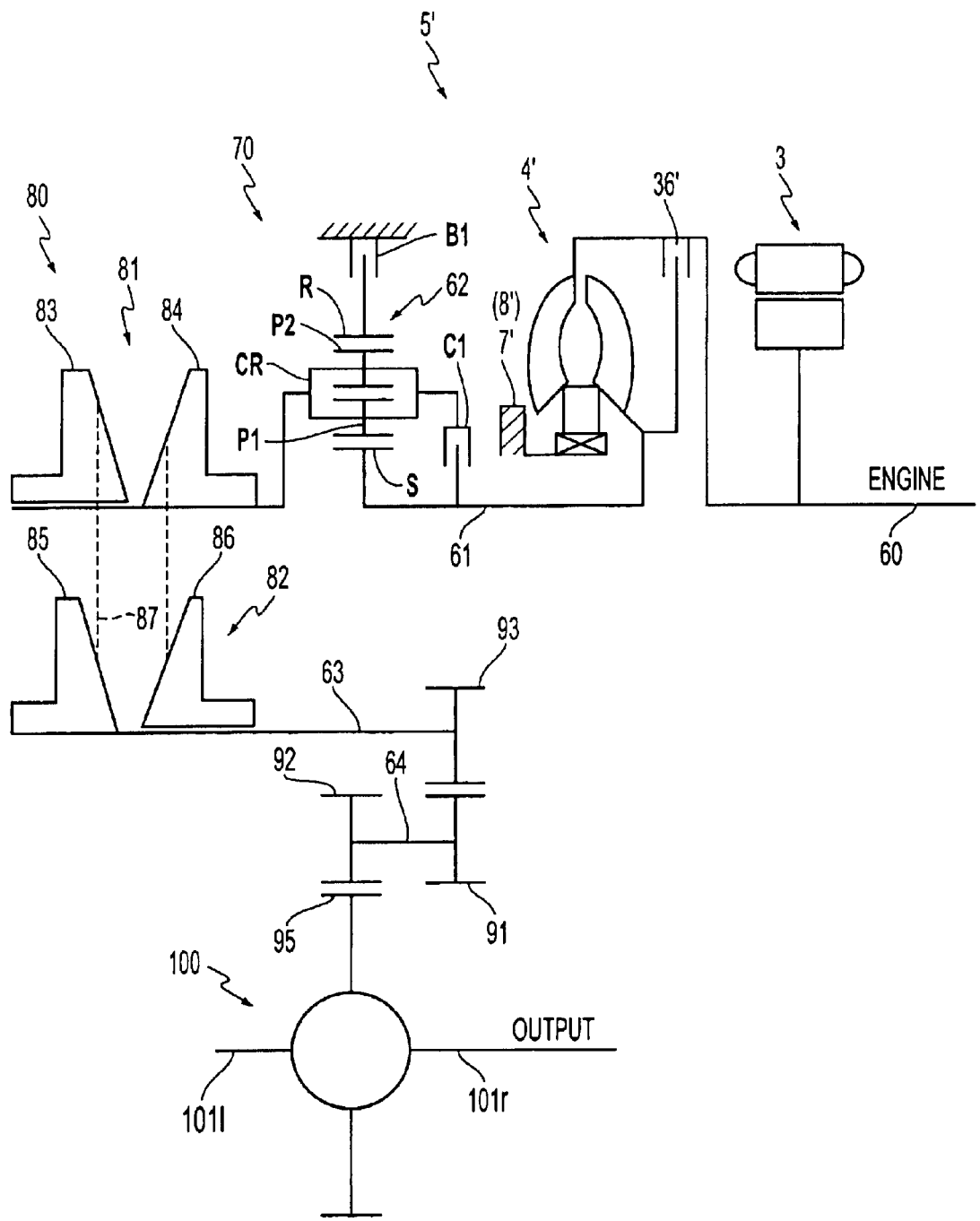
FIG. 13 is a skeleton view showing a continuously variable speed change mechanism applied to the invention.

FIG. 13 is a skeleton view showing a continuously variable speed change mechanism 5' as applied to the present invention. In the drawings, reference numeral 5' denotes a continuously variable transmission (CVT) for a hybrid vehicle, which is constructed by attaching a motor/generator 3 to a belt type continuously variable transmission provided with a torque converter 4', a forward/reverse switching unit 70, a belt type continuously variable speed change unit 80 and a differential unit 100. Moreover, the CVT 5' is connected to an internal combustion engine 2 (not shown in the drawings, while an output shaft 60 is shown). In the CVT 1, the torque converter 4', the forward/reverse switching unit 70, a primary pulley 81 of the belt type continuously variable speed change unit 80, and the motor/generator 3 are placed on a first shaft in line with the internal combustion engine output shaft 60, and a secondary pulley 82 of the belt type continuously variable speed change mechanism is placed on a second shaft in parallel with the aforementioned first shaft.

In a position overlapping a shaft direction of the motor/generator 3, a lock-up clutch 36' made by a multi-plate clutch is placed, an input portion of the lock-up clutch 36' is coupled to the engine output shaft 60 and the motor/generator 3, and an output portion of the lock-up clutch is coupled to a turbine runner of the torque converter 4' and an input shaft 61. Moreover, a stator of the torque converter 4' is coupled to a mechanical oil pump 7 via a one-way clutch.

The forward/reverse switching unit 70 has a double-pinion planetary gear 62, a reverse brake B1 and a direct clutch (a forward clutch or an input clutch) C1. In the planetary gear 62, a sun gear S thereof is coupled to the input shaft 61, and a carrier CR supporting first and second pinions P1 and P2 is coupled to the primary pulley 81 of the belt type continuously variable speed change unit 80. Moreover, a ring gear R is coupled to the aforementioned reverse brake B1, and the direct clutch C1 is interposed between the carrier CR and the ring gear R.

On the other hand, the belt type continuously variable speed change unit 80 is provided with the primary pulley 81 composed of a fixed sheave 84 fixed to a primary shaft and a moving sheave 83 supported by the shaft so as to be capable only of sliding, the secondary pulley 82 composed of a fixed sheave 85 fixed to a secondary shaft 63 and a moving sheave 86 supported by the shaft so as to be capable of sliding only, and a power transmission belt 87 made of metal and wound around both the pulleys.

Hydraulic actuators are placed at the back of the moving sheave 83 on the primary side and at the back of the moving sheave 86 on the secondary side, respectively, and when receiving a signal from the aforementioned transmission control unit 15, a hydraulic control unit 6 causes these moving sheaves 83 and 86 to slide to thereby change a pulley width of both the pulleys 81 and 82 and change a diameter of a holding face of the aforementioned belt 87, and controls a gear ratio (also referred to as 'a pulley ratio' hereafter) at will.

Between the above secondary shaft 63 and the differential unit 100, a counter shaft 64 is supported to a case so as to be rotatable, and a large gear 91 and a small gear 92 are fixed to the counter shaft 64. The large gear 91 is meshed with a gear 93 fixed to the secondary shaft 63, and the small gear 92 is meshed with a gear 95 of the differential unit 100. The differential unit 100 transmits rotation of a differential gear supported by a differential case from the gear 95 to left and right axles 101l and 101r via left and right side gears (not shown).

Since the hybrid vehicle having the continuously variable speed change mechanism 5' has a construction as described above, while the vehicle is running, the aforementioned vehicle control unit 13 executes the congested road judgment program JJP shown in FIG. 4 at all times to judge whether a present running state is congested road running, and in the case of a judgment as running on a congested road at present, executes a congested road control program JCP'.

Figure 14:
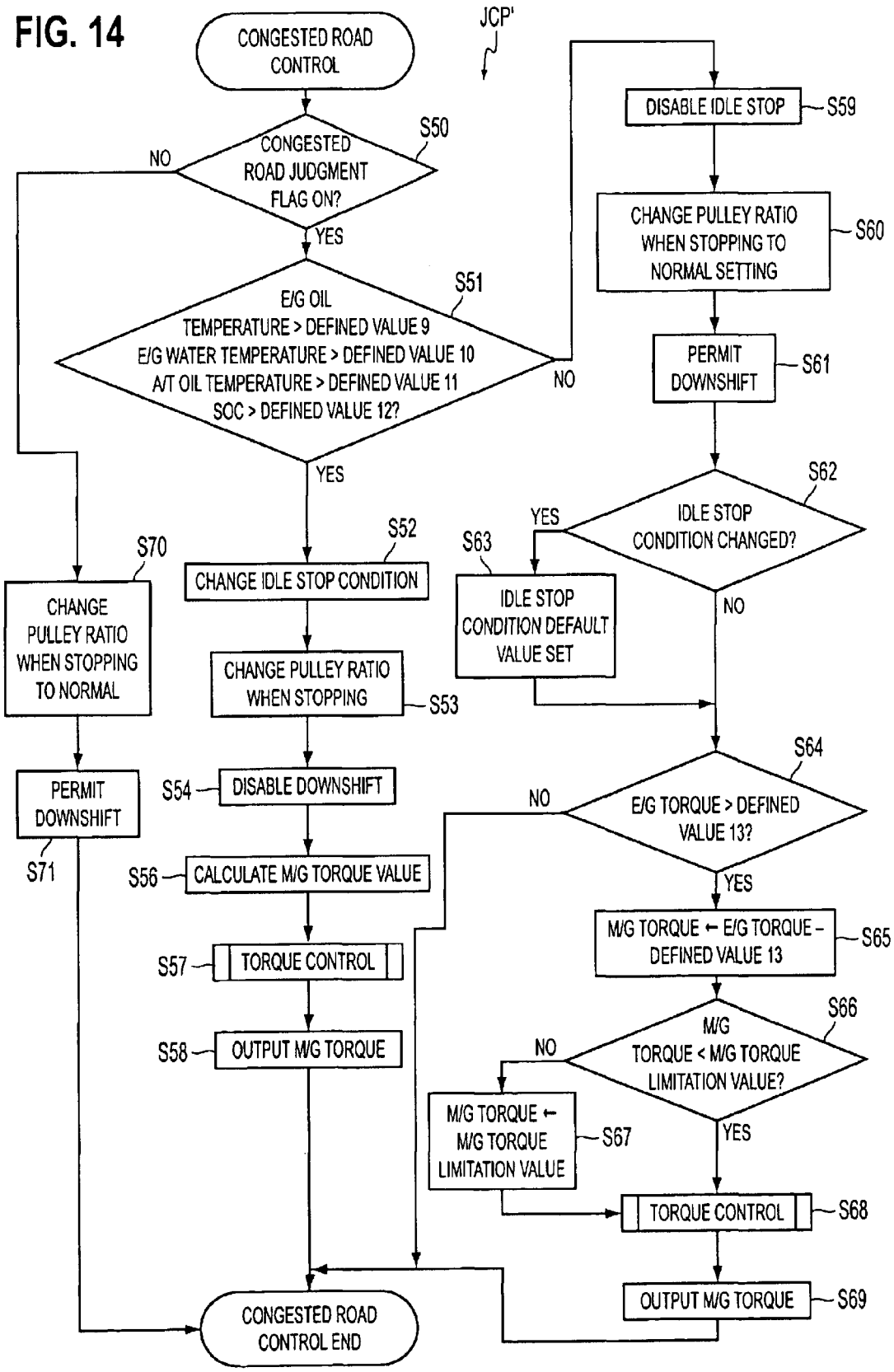
FIG. 14 is a flowchart showing one example of a congested road control program.
Figure 15:
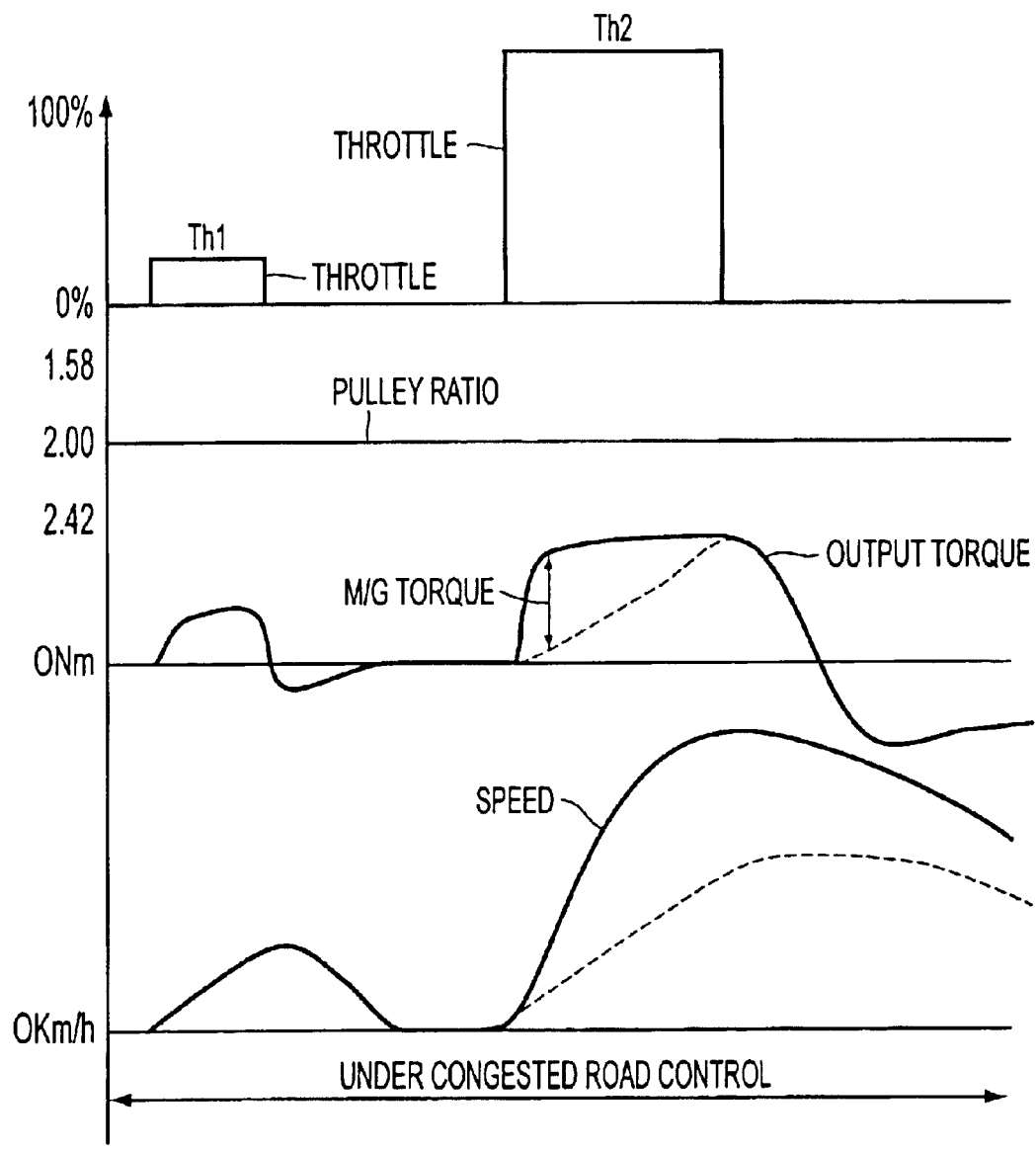
FIG. 15 is a view showing a relation of the throttle angle, a pulley ratio, the vehicle output and the vehicle speed when using torque assist by the motor/generator.
Figure 16:
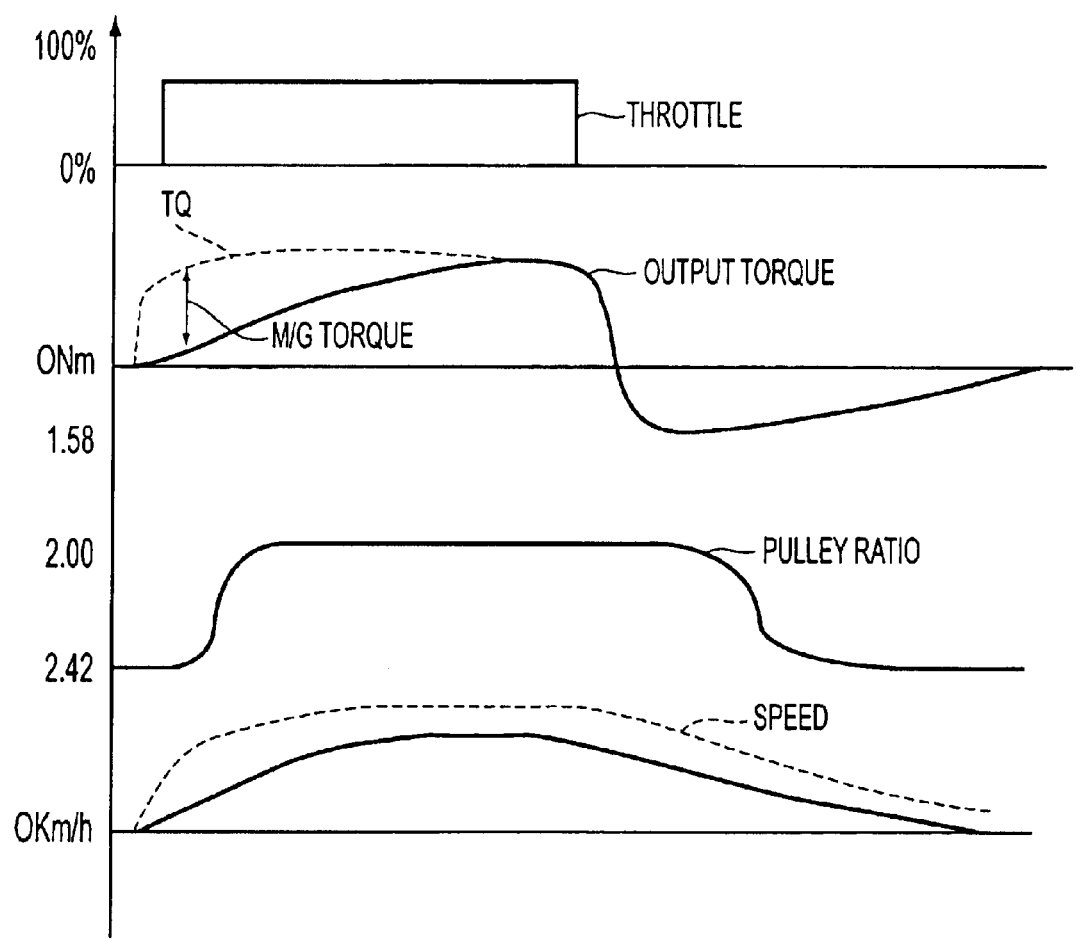
FIG. 16 is a view showing a relation of the throttle angle, the pulley ratio, the vehicle output and the vehicle speed at the time when the regenerating operation is carried out by the motor/generator.
Figure 17:
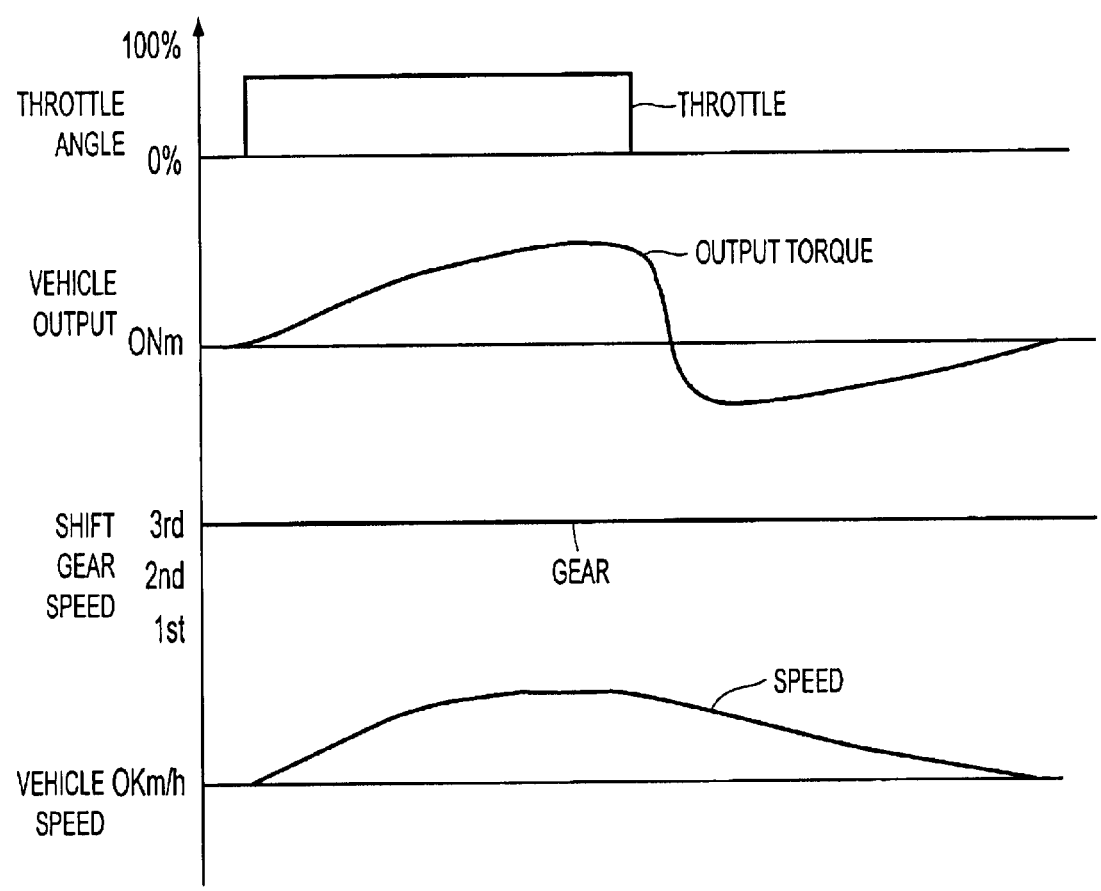
FIG. 17 is a time chart showing one example of downshift disabling control on a congested road.

FIG. 14 is a flowchart showing one example of the congested road control program, FIG. 15 is a view showing a relation of the throttle angle, the pulley ratio, the vehicle output and the vehicle speed when using torque assist by the motor/generator, and FIG. 16 is a view showing a relation of the throttle angle, the pulley ratio, the vehicle output and the vehicle speed when performing a regenerating operation by the motor/generator.

In the hybrid vehicle having the continuously variable speed change mechanism 5', the congested road judgment program JJP is the same as that in the hybrid vehicle having the aforementioned stepped speed change mechanism 5, and therefore, a description thereof will be omitted. For a case in which the congested road judgment program JJP is performed and the congested road judgment flag is turned ON, the vehicle control unit 13 executes the congested road control program JCP' shown in FIG. 14. Then, the congested road control program JCP, at step S50, checks whether the congested road judgment flag is ON. If the congested road judgment flag is not on, the pulley ratio when stopping is changed to normal at step S70 and a down shift is permitted S71.

At step S51, congested road control program JCP judges whether the oil temperature of the engine 2 is equal to or more than a defined value '9' (a temperature at which the engine oil temperature reaches a normal temperature: for example, about 30° C.), whether the water temperature of the engine 2 is equal to or more than a defined value '10' (a temperature at which the engine water temperature reaches a normal temperature: for example, about 30° C.), whether the oil temperature of the automatic speed change mechanism 5' is equal to or more than a defined value '11' (a temperature at which the oil temperature of the automatic speed change mechanism reaches a normal temperature: for example, about 30° C.), and whether the SOC of the battery is equal to or more than a defined value '12' (a degree at which the torque assist described later can be performed several times at the time of idle stop control: for example, about 40%). That is, the congested road control program JCP judges a state of a drive portion of the hybrid vehicle.

More specifically, for a case in which the oil temperature of the engine 2 is over the defined value '9', the water temperature of the engine 2 is over the defined value '10', the oil temperature of the automatic speed change mechanism 5 is over the defined value '11' or the SOC of the battery is over the defined value '12', the engine 2 is in a normal running state and the charge capacity of the battery driving the motor/generator 3 is sufficient, so that a busy-shifting prevention operation by torque assist using the motor/generator 3 described later is performed. Moreover, at step S51, a case where the oil temperature of the engine 2 is equal to or less than the defined value '9', the water temperature of the engine 2 is equal to or less than the defined value '10', the oil temperature of the automatic speed change mechanism 5 is equal to or less than the defined value '11' or the SOC of the battery is equal to or less than the defined value '12' (it is preferable to use AND/OR of a forming condition of these parameters in combination as necessary according to a condition of the vehicle) is a case in which warming-up is necessary because the engine 2 and the automatic speed change mechanism 5' have just been actuated. Furthermore, a case where the SOC of the battery is low and torque assist using the motor/generator 3 cannot be sufficiently performed, so that control is executed in such a manner that warming-up of the engine 2 and a charging operation to increase the SOC of the battery take priority over a busy-shifting prevention operation will be described later.

Here, busy shifting is not the frequent switching of a shift speed described regarding the aforementioned stepped speed change mechanism 5, but the frequent changing of the pulley width of the belt type continuously variable speed change unit 80 of the aforementioned continuously variable speed change mechanism 5'. That is, the frequent changing of a gear ratio whereby upshift/downshift is frequently repeated.

In the case of performing a busy-shifting prevention operation by torque assist using the motor/generator 3 at step S51, conditions at the time of idle stop are changed at step S52. More specifically, various kinds of parameters during idle stop which stops the engine 2 when the vehicle stops and stops the idling of engine 2 are changed, in consideration of congested conditions, so that the engine is as difficult to start as possible and the vehicle can run using the motor/generator 3 when it begins to move. Specifically, for example, an actuation condition of the engine 2 is changed from a vehicle speed of 0 Km/h to 10 Km/h, and actuation of the engine 2 by brake-off is stopped.

Next, at step S53, a pulley ratio when the vehicle stops is changed. More specifically, when the vehicle stops, a pulley width of the aforementioned belt type continuously variable speed change unit 80 is changed and set not to a pulley width when the vehicle normally stops but to a pulley ratio (for example, 2.00) on an upshift side of a state where a pulley ratio is small (a gear ratio is large), whereby output torque from a driving source (the engine or the motor/generator) when the vehicle takes-off is made to be small. Subsequently, at step S54, downshift is disabled by the transmission control unit 15, that is, because it is set to the upshift side more than the pulley ratio that is calculated from the shifting line view and the like in the normal running state, it is disabled so that the pulley ratio is not changed to a downshift side even when the vehicle takes-off.

Next, at step S56, output torque of the motor/generator 3 that corresponds to the throttle angle and the motor/generator revolution is found from the torque output map of the motor/generator shown in FIG. 7. When the throttle angle and the revolution of the engine 2 (that is, the revolution of the motor/generator 3) at present are ascertained from this output map, the torque to assist by the motor/generator 3 is immediately ascertained. Regarding output of the motor/generator 3, output torque may be found from the throttle angle and the vehicle speed, or only from the throttle angle by the use of specified maps, respectively.

Next, at steps S57 and S58, the motor control unit 12 is directed to perform torque assist to the engine 2. More specifically, for example, as shown in FIG. 15, both for a case in which a throttle angle becomes Th1 and for a case in which it becomes Th2 larger than Th1 as a result of the throttle being actuated in a congested road judgment flag ON state, as described regarding step S54, downshift is disabled by the transmission control unit 15 because the congested road judgment flag is ON, and a pulley ratio is fixed to, for example, 2.00, which is a state where a gear ratio is large. Despite the take-off at a pulley ratio of, for example, 2.00 regardless of the throttle angle, because the take-off is on a congested road the take-off at low torque is slow.

In the case of a small throttle angle Th1, a driver is not intending to rapidly accelerate the vehicle, and therefore, there is no problem with rotating only the engine 2 and taking-off in such a manner. Also in this case, based on the output map shown in FIG. 7, the torque assist may be performed by driving the motor/generator 3.

Moreover, in the case of a larger throttle angle Th2, the driver temporarily requires large torque and desires a rapid takeoff, whereas with rotation of only the engine 2, output torque OutPutTrq has a smooth gradient and a vehicle speed Speed shows slow acceleration as shown by a broken line in FIG. 9. Under such circumstances, compared with the conventional control method of canceling congested road control as shown in FIG. 18, output torque is largely weakened, and the driver feels a sense of discomfort.

Therefore, for a case in which a throttle angle reaches a value larger than a specified value, the motor control unit 12 immediately performs the torque assist to the engine 2 based on the output map shown in FIG. 7, and outputs only a part of the torque M/G Trq corresponding to a part of the under torque to the automatic speed change mechanism 5' side as shown by a solid line in FIG. 15. Consequently, as shown by the solid line of FIG. 15, the output torque OutPutTrq of the vehicle largely increases from a time of throttle actuation, and concomitantly, the vehicle speed. Speed also rapidly increases. As such, regardless of the gear ratio, for example, 2.00 because of downshift disabling, it is possible to provide an acceleration feeling intended by the driver.

Thus, by performing torque assist by the motor/generator 3, it is possible without canceling congested road control to quickly meet even a temporary torque request of a driver at a low torque output state where a vehicle is in a downshift disabling state. Furthermore, since the low torque output state of the vehicle is maintained, even when a congested state continues, it is possible to continue congested road control, that is, a take-off operation from a large gear ratio maintained until then, and it is possible to prevent busy shifting and the occurrence of a sense of jumping out as in a take-off from a normal state of a small gear ratio.

By increasing the amount of torque assist by the motor/generator 3, it is possible to set the gear ratio used for a take-off to a higher speed (for example, a pulley ratio of 2.00 or less), and it is possible to further prevent busy shifting.

Moreover, at step S51, a case in which the oil temperature of the engine 2 is equal to or less than the defined value '9', or the water temperature of the engine 2 is equal to or less than the defined value '10', or the oil temperature of the automatic speed change mechanism 5' is equal to or less than the defined value '11' or the SOC of the battery is equal to or less than the defined value '12' is a case where warming-up is necessary because the engine 2 and the automatic speed change mechanism 5' have just been actuated. Also, a case in which the SOC of the battery is low and torque assist using the motor/generator 3 cannot be sufficiently performed, control is executed in such a manner that warming-up of the engine 2 and the charging operation to increase the SOC of the battery takes priority over a busy-shifting prevention operation.

Thereby, at step S59, the idle stop control for stopping the engine 2 when the vehicle stops is disabled, and the operation for charging the battery takes priority. This step may not be executed for a case in which the amount of the SOC of the battery is sufficient. Next, at step S60, for a case in which a pulley ratio when the vehicle stops is changed to an upshift side with a pulley ratio of, for example, 2.00 because of execution of step S53 and so on described before, the setting is changed to a normal pulley ratio when the vehicle stops (for example, 2.42), and returns to a normal setting. Then, at step S61, downshift is permitted, and for a case in which downshift is disabled at step S54 and so on, the disabling is canceled, and a return is made to a normal shifting state.

Next, at step S62, for a case in which conditions of idle stop are changed at step S52 and so on, conditions of normal idle stop are restored at step S63, whereby the engine is set to easily start when stopped, and the motor/generator 3 is set so as not to be used when possible. For a case in which idle stop is disabled at step S59, this step is meaningless, and therefore, skipped.

When a running state of the vehicle is thus returned from a congested road control state to a normal running state in a change of a pulley ratio and idle stop control, it is judged at step S64 whether the present engine torque exceeds a defined value '13'. This defined value '13' is a torque value of the level of no jump-out torque, and a value of the level of output torque in the case of a pulley ratio of 2.00, for example. For a case in which present engine torque is less than the defined value '13' and there is no jump-out torque, there is no wasteful torque production from the engine, and therefore, it is impossible to use such jump-out torque and use the motor/generator 3 for the regenerating operation, so that the congested road control program JCP' is ended.

Moreover, for a case in which the present engine torque is over the defined value '13' and there is some jump-out torque at step S64, a value of the defined value '13', that is, a part of the torque presently needed to move the vehicle is derived from the present engine torque, and a part of jump-out torque which does not contribute to movement of the vehicle is calculated as motor/generator (M/G) torque at the time of regenerating the motor/generator 3 at step S65.

At step S66, regarding the motor/generator (M/G) torque found at step S65, referring to a regeneration side motor torque output limitation value map MAP shown in FIG. 10, it is judged whether the torque exceeds a torque limitation value of the motor/generator. For a case in which the motor/generator (M/G) torque is over the torque limitation value of FIG. 10, motor/generator (M/G) torque at the time of regeneration is set as a torque limitation value at step S67. Then, at steps S68 and S69, a control operation of output torque of the vehicle is started, and a regenerating operation by the motor/generator 3 is performed.

In this case, as shown in FIG. 16, when the driver actuates the throttle, the automatic transmission is caused to perform a normal shifting operation by the transmission control unit 15, a take-off is performed from a pulley ratio of, for example, 2.42, output torque OutPutTrq including jump-out torque TQ with a rapid torque increase is observed at the axels 101l and 101r as shown by a broken line in FIG. 16. When torque control is not performed by the motor/generator 3, the vehicle speed is rapidly accelerated from a stop state, so that a good driving feeling is not necessarily produced on a congested road where high acceleration is unnecessary. However, in a state where the water temperature and the oil temperature of the engine and the oil temperature in the automatic transmission are low, because the engine rotates at a high output, warming-up can be performed.

In a case in which the motor/generator 3 is used in a regenerating operation so as to absorb jump-out torque TQ as shown by a solid line in FIG. 16, extra jump-out torque TQ is consumed for a power generating operation of the motor/generator 3 so as to contribute to the improvement of the SOC of the battery, and since the jump-out torque TQ is consumed by the motor/generator 3, a vehicle speed rises slowly from a stop state as shown by the solid line in the drawing, and the vehicle can take-off in such a behavior as if taking-off in a state of a large gear ratio suitable for running on a congested road. Moreover, a warming-up operation of the engine can be performed as it is, and a good driving state can be obtained. Since the battery is consequently charged, it is possible to decrease the need to start the engine to charge the battery at the time of idle stop control thereafter, and effectively perform idle stop control.

Next, effects of the embodiments will be described. According to the embodiments, since the under torque replenishing device replenishes a part of the under torque M/G Trq of the driving source (refer to FIGS. 9 and 15) by the motor/generator drive at the time of temporary acceleration during congested road running, even for a case in which a temporary high acceleration take-off request (for example, the throttle angle Th2 in FIG. 9 and the throttle angle Th2 in FIG. 15) is made during congested road running, it is possible to perform a take-off operation without a sense of discomfort in the form of maintaining a take-off operation from a state where the gear ratio of the automatic transmission is large. Also, consequently, since there is no need to cancel congested road control, a take-off from a state where a gear ratio of the automatic transmission is small is prevented, and busy shifting is prevented.

Moreover, since the temporary acceleration judging device judges whether to maintain a judgment of congested road running by the congested road judging means for a case in which a temporary high acceleration take-off request (for example, the throttle angle Th2 in FIG. 9 and the throttle angle Th2 in FIG. 15) is made, the cancellation of the congested road judgment simply at a time when the high acceleration take-off request occurs is prevented, and take-off control with an even less sense of discomfort is enabled.

Moreover, it is possible to easily find torque to replenish by the driving of motor/generator from the output map of the motor/generator that corresponds to the throttle angle (for example, refer to FIG. 7), and control is facilitated. Furthermore, it is possible to apply the output map to a driving condition of the vehicle.

Moreover, since the vehicle control unit 13 (for example, step S32 of the congested road control program JCP and step S52 of the congested road control program JCP') that serves as the actuation control device during congestion shifts actuation conditions of the internal combustion engine to a high vehicle speed side while a judgment of congested road running is maintained by the congested road judging device, it is difficult to activate the internal combustion engine, and thereby because torque assist by the motor/generator is enabled, the internal combustion engine can be activated in a state where a gear ratio of the automatic transmission is large, and it is possible to prevent busy shifting.

On the other hand, according to the embodiments, for a case in which the congested road judging device judges that the vehicle is running on a congested road, it is possible at the time of take-off by the internal combustion engine to cause the automatic transmission to perform normal shifting and perform a regenerating operation by driving the motor/generator with extra torque produced from the internal combustion engine when taking-off. By charging the battery and ensuring a sufficient SOC, it is possible to effectively perform idle stop control, which is a characteristic of a hybrid vehicle.

Moreover, because the vehicle control unit 13 that serves as the idle stop control disabling device (for example, step S37 of the congested road control program JCP and step S59 of the congested road control program JCP') disables idle stop control during congested road running, it is possible to effectively charge the battery.

Furthermore, since the regeneration control device is driven when the SOC monitored by the SOC monitoring device becomes smaller than a specified value, the battery is charged by regeneration of the motor/generator only when necessary. Therefore, when the SOC is large and there is no need to charge, it is possible to perform idle stop control, and it is possible to maximize a feature of a hybrid vehicle.

Moreover, according to the embodiments, since the vehicle control unit 13 serving as actuation control switching device (for example, the congested road control program JCP and the congested road control program JCP') selects and executes a regenerating operation or an operation of replenishing the under torque in accordance with a warming-up state of the internal combustion engine and the automatic transmission, optimum control responsive to a state of the vehicle is enabled.

Furthermore, since it is judged from at least one of the oil temperature and the water temperature of the internal combustion engine and the oil temperature of the automatic transmission whether the internal combustion engine and the automatic transmission are in a warming-up state, an appropriate judgment is enabled.

Moreover, according to the embodiments, since the actuation control switching device controls so as to execute the regenerating operation by the regeneration control device when the vehicle takes-off during congested road running for a case in which the SOC of the battery is judged as being equal to or less than a defined value, and execute an operation for replenishing the under torque by the under torque replenishing device when the vehicle takes-off during congested road running for a case in which the SOC of the battery is judged as being equal to or more than the defined value, appropriate control is enabled in response to the battery state.

Moreover, since the automatic stepped transmission 5 has a plurality of friction engagement elements C1, C2, C3, B1, B2, B3, B4, B5, F1 and F2 and the gear mechanisms 30 and 40 forming a plurality of shift speeds that shift input rotation based on an engagement state of the friction engagement elements, it is possible to differentiate the gear ratio by switching the shift speeds. As a result, combined with the drive of the motor/generator, it is possible, for example, to prevent busy shifting and charge the battery.

Moreover, since the automatic continuously variable transmission 5' has a pair of pulleys 81 and 82 and the power transmission belt 87 held tight by the pulleys 81 and 82, it is possible to differentiate the gear ratio based on a pulley width of the pulleys 81 and 82. As a result, combined with the drive of the motor/generator, it is possible, for example, to prevent busy shifting and charge the battery.

What is claimed is:

1. A control apparatus for a hybrid vehicle with an internal combustion engine and a motor/generator connected to the internal combustion engine used as a driving source, an automatic transmission connected to the driving source, axles connected to the automatic transmission, and a sensor for detecting a running state of the vehicle, comprising:

a controller that:
  judges whether the vehicle is running on a congested road based on an output from the sensor;
  causes a take-off from a first state where a gear ratio of the automatic transmission is large at a time of taking-off when running on the congested road;
  causes the take-off from a second state where the gear ratio of the automatic transmission is small at the time of taking-off when not running on the congested road; and
  replenishes, by driving the motor/generator, a part of an under torque of the driving source created by taking-off from a state where the gear ratio of the automatic transmission is large, when a temporary high acceleration take-off request is made while a judgment of congested road running is maintained.

2. The control apparatus of the hybrid vehicle according to claim 1, wherein the controller maintains the judgment of congested road running based on a development of a temporary acceleration take-off state during congested road running.

3. The control apparatus of the hybrid vehicle according to claim 1, wherein the controller has a first output map of the motor/generator associated with a throttle angle and determines a torque to replenish by driving the motor/generator based on the output map.

4. The control apparatus of the hybrid vehicle according to claim 3, wherein the first output map has a second output map of the motor/generator associated with the throttle angle and a vehicle speed.

5. The control apparatus of the hybrid vehicle according to claim 3, wherein the first output map has a third output map of the motor/generator associated with the throttle angle and a motor revolution.

6. The control apparatus of the hybrid vehicle according to claim 1, wherein the controller shifts an actuating condition of the internal combustion engine to a high vehicle speed side while the judgment of congested road running is maintained.

7. The control apparatus of the hybrid vehicle according to claim 1, wherein the automatic transmission is an automatic stepped transmission which has a plurality of friction engagement elements and a gear mechanism forming a plurality of shift speeds shifting input rotation based on an engagement state of the friction engagement elements and differentiates a gear ratio by switching the shift speeds.

8. The control apparatus of the hybrid vehicle according to claim 1, wherein the automatic transmission is an automatic continuously variable transmission which has a pair of pulleys and a power transmission belt held tight by the pulleys and differentiates a gear ratio based on a pulley width of the pulleys.

9. A hybrid vehicle, comprising:
an internal combustion engine;
a motor/generator connected to the internal combustion engine, wherein the internal combustion engine and the motor/generator are used as a driving source;
an automatic transmission connected to the driving source;
axles connected to the automatic transmissions;
a sensor for detecting a running state of the vehicle; and
a controller that:
    judges whether the vehicle is running on a congested road based on an output from the sensor;
    causes the automatic transmission to perform normal shifting at a time of take-off by the internal combustion engine; and
    consequently causes a regenerating operation by driving the motor/generator with extra torque produced from the internal combustion engine at the time of take-off, for a case in which when the vehicle is running on the congested road.

10. The hybrid vehicle according to claim 9, wherein the controller disables control to stop the internal combustion engine when the vehicle stops when the vehicle is running on the congested road.

11. The hybrid vehicle according to claim 9, further comprising:
a state of charge monitoring device which monitors a state of charge of the battery, wherein the controller causes the automatic transmission to perform normal shifting and causes regeneration when the state of charge is less than a specified value.

12. The hybrid vehicle according to claim 9, wherein the automatic transmission is an automatic stepped transmission which has a plurality of friction engagement elements and a gear mechanism forming a plurality of shift speeds that shift input rotation based on an engagement state of the friction engagement elements and differentiates a gear ratio by switching the shift speeds.

13. The hybrid vehicle according to claim 9, wherein the automatic transmission is an automatic continuously variable transmission which has a pair of pulleys and a power transmission belt held tight by the pulleys and differentiates a gear ratio based on a pulley width of the pulleys.

14. The hybrid vehicle according to claim 9, wherein the controller:
    judges whether the internal combustion engine and the automatic transmission are in a warming-up state;
    executes a normal shifting operation and a regenerating operation when the vehicle takes-off during congested road running when the internal combustion engine and the automatic transmission in a warming-up state; and
    executes an operation of taking off from a state where a gear ratio of the automatic transmission is large and replenishing under torque when the vehicle takes-off during congested road running when the internal combustion engine and automatic transmission in a normal running state.

15. The hybrid vehicle according to claim 14, controller judges from at least one of an oil temperature and water temperature of the internal combustion engine and an oil temperature of the automatic transmission whether the internal combustion engine and automatic transmission are in the warming-up state.

16. The hybrid vehicle according to claim 14, wherein the automatic transmission is an automatic stepped transmission which has a plurality of friction engagement elements and a gear mechanism forming a plurality of shift speeds that shift input rotation based on an engagement state of the friction engagement elements and differentiates a gear ratio by switching the shift speeds.

17. The hybrid vehicle according to claim 14, wherein the automatic transmission is an automatic continuously variable transmission which has a pair of pulleys and a power transmission belt held tight by the pulleys and differentiates a gear ratio based on a pulley width of the pulleys.

18. The hybrid vehicle according to claim 9, wherein the controller:
    judges a state of charge of a battery driving the motor/generator;
    executes a normal shifting operation and a regenerating operation when the vehicle takes-off during congested road running when the state of charge of the battery is equal to or less than a defined value; and
    executes an operation of taking off from a state where a gear ratio of the automatic transmission is large and replenishing under torque when the vehicle takes-off during congested road running in the case of when the state of charge of the battery is equal to or more than the defined value.

19. The hybrid vehicle according to claim 18, wherein the automatic transmission is an automatic stepped transmission which has a plurality of friction engagement elements and a gear mechanism forming a plurality of shift speeds shifting input rotation based on an engagement state of the friction engagement elements and differentiates a gear ratio by switching the shift speeds.

20. The hybrid vehicle according to claim 18, wherein the automatic transmission is an automatic continuously variable transmission which has a pair of pulleys and a power transmission belt held tight by the pulleys and differentiates a gear ratio based on a pulley width of the pulleys.

21. A method of operating a hybrid vehicle with an internal combustion engine and a motor/generator connected to the internal combustion engine used as a driving source, an automatic transmission connected to the driving source, axles connected to the automatic transmission, and a sensor for detecting a running state of the vehicle, comprising:

- judging whether the vehicle is running on a congested road based on an output from the sensor;
- causing a take-off from a first state where a gear ratio of the automatic transmission is large at a time of taking-off when running on the congested road;
- causing the take-off from a second state where the gear ratio of the automatic transmission is small at the time of taking-off when not running on the congested road; and
- replenishing, by driving the motor/generator, a part of an under torque of the driving source created by taking-off from a state where the gear ratio of the automatic transmission is large, when a temporary high acceleration take-off request is made while a judgment of congested road running is maintained.

22. A method of operating a hybrid vehicle with an internal combustion engine, a motor/generator connected to the internal combustion engine wherein the internal combustion engine and the motor/generator are used as a driving source, an automatic transmission connected to the driving source, axles connected to the automatic transmission, and a sensor for detecting a running state of the vehicle, comprising:

- judging whether the vehicle is running on a congested road based on an output from the sensor;
- causing the automatic transmission to perform normal shifting at a time of take-off by the internal combustion engine; and
- causing, consequently, a regenerating operation by driving the motor/generator with extra torque produced from the internal combustion engine at the time of take-off, for a case in which when the vehicle is running on the congested road.

* * * * *